United States Patent
Nishioka

(10) Patent No.: US 6,240,517 B1
(45) Date of Patent: May 29, 2001

(54) INTEGRATED CIRCUIT CARD, INTEGRATED CIRCUIT CARD PROCESSING SYSTEM, AND INTEGRATED CIRCUIT CARD AUTHENTICATION METHOD

(75) Inventor: Mitsuru Nishioka, Tokyo (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/016,406

(22) Filed: Jan. 30, 1998

(30) Foreign Application Priority Data

Jan. 31, 1997 (JP) .................................................. 9-019399

(51) Int. Cl.[7] .................................................. H04N 17/00
(52) U.S. Cl. .......................... 713/201; 713/159; 713/168; 713/172; 380/255
(58) Field of Search .............................. 380/255; 713/159, 713/161, 168, 169, 172, 185, 200, 201

(56) References Cited

U.S. PATENT DOCUMENTS

| | | |
|---|---|---|
| 4,799,061 | 1/1989 | Abraham et al. ............... 340/825.34 |
| 5,293,029 | 3/1994 | Iijima .................................... 235/380 |
| 5,436,971 | 7/1995 | Armbrust et al. ...................... 380/23 |
| 5,546,446 | 8/1996 | Tsumokawa et al. ................ 379/114 |
| 5,774,546 | * 6/1998 | Handelman et al. ..................... 380/4 |
| 5,857,024 | * 1/1999 | Nishino et al. ......................... 380/25 |
| 5,901,284 | * 5/1999 | Hamdy-Swink ...................... 395/186 |
| 5,917,168 | * 6/1999 | Nakamura et al. ................... 235/379 |

FOREIGN PATENT DOCUMENTS

| | | |
|---|---|---|
| 0552392 | 7/1993 | (EP) . |
| 0654919 | 5/1995 | (EP) . |
| 0723251 | 7/1996 | (EP) . |

* cited by examiner

*Primary Examiner*—Thomas R. Peeso
(74) *Attorney, Agent, or Firm*—Pillsbury Madison & Sutro LLP Intellectual Property Group

(57) ABSTRACT

An IC card processing system includes a telephone set for generating random number data, an IC card for processing value data, a secret key, and random number data by an authenticator generation function to generate authentication code, a switching unit for processing value data, a secret key, and random number data by an authenticator generation function to generate authentication code, and a comparator for comparing the authentication code generated by the IC card with the authentication code generated by the switching unit to authenticate the IC card.

20 Claims, 15 Drawing Sheets

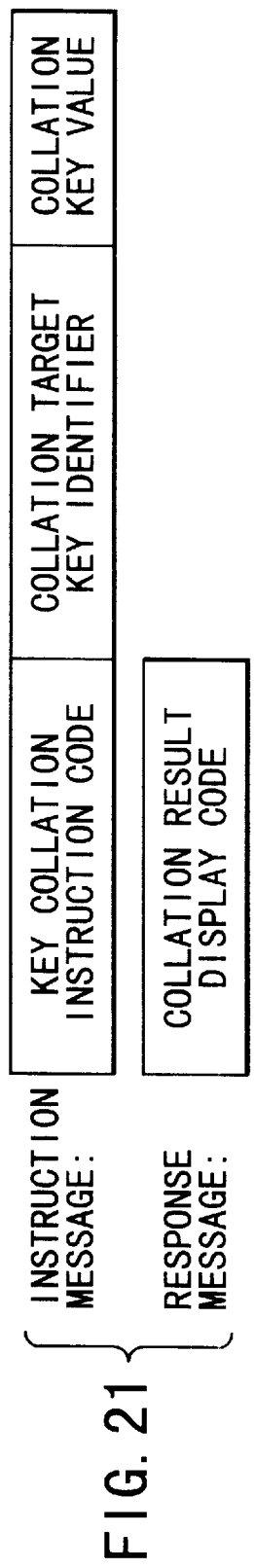
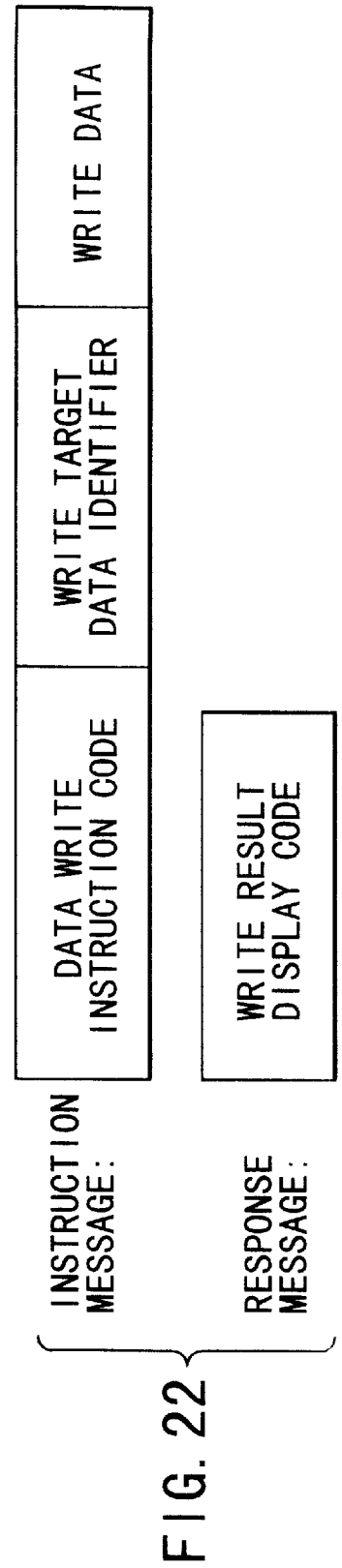

INTEGRATED CIRCUIT CARD, INTEGRATED CIRCUIT CARD PROCESSING SYSTEM, AND INTEGRATED CIRCUIT CARD AUTHENTICATION METHOD

BACKGROUND OF THE INVENTION

The present invention relates to authentication of an IC (Integrated Circuit) card and, more particularly, to an IC card, an IC card processing system for processing the IC card, and an IC card authentication method of authenticating the IC card.

At present, a public telephone can be used by a telephone card serving as a kind of prepaid card. In the future, an IC card will function as a prepaid card to use the public telephones. In this case, confirmation of the validity of the IC card (authentication of the IC card) by the device (public telephone) is performed as follows. For example, key data permanently held by the device is processed by key data stored in the IC card to authenticate the IC card by the processing results. Alternatively, a password number input by the card holder may be used. This card authentication is basically executed by a program and the like stored in the device for processing the card.

In the above card authentication, however, if transmission contents between the IC card and the device are monitored, the monitored data may be used as clues for card forgery or system analysis. Further, the device may be stolen to analyze a program stored in it, and the analyzed program may be used as a clue for card forgery or system analysis.

BRIEF SUMMARY OF THE INVENTION

It is an object of the present invention to provide an IC card, an IC card processing system, and an IC card authentication method in which secret information serving as the main key of security hardly leaks out.

It is another object of the present invention to provide an IC card processing system and authentication method in which, even when secret information serving as the main key of security leaks out, illicit use with the leaking secret information can be prevented.

According to the present invention, there is provided an IC card, comprising: communication means for externally performing data communication; memory means for storing value data representing an effective value, and authentication code generation data used to generate authentication code necessary for authentication of the IC card; and authentication code generation means for processing the value data stored in the memory means and external data externally supplied via the communication means, by using the authentication code generation data stored in the memory means to generate the authentication code.

According to the present invention, there is provided an IC card processing system comprising an IC card, and an IC card processing device for processing the IC card, the IC card having: first communication means for performing reception of random number data transmitted from the IC card processing device, and transmission of value data representing an effective value and first authentication code generated by the IC card to the IC card processing device; first memory means for storing the value data, and first authentication code generation data used to generate the first authentication code; and first authentication code generation means for processing the value data stored in the first memory means and the random number data received via the first communication means, by using the first authentication code generation data stored in the first memory means to generate the first authentication code, and the IC card processing device having: second communication means for performing reception of the value data and the first authentication code transmitted from the IC card, and transmission of the random number data generated by the IC card processing device to the IC card; second memory means for storing second authentication code generation data identical to the first authentication code generation data to generate second authentication code; random number generation means for generating the random number data; second authentication code generation means for processing the value data received via the second communication means and the random number data generated by the random number generation means, by using the second authentication code generation data stored in the second memory means to generate the second authentication code; determination means for comparing the second authentication code generated by the second authentication code generation means with the first authentication code received via the second communication means to determine validity of the IC card subjected to communication via the second communication means; and card handling means for handling the IC card subjected to communication via the second communication means on the basis of a determination result of the determination means.

According to the present invention, there is provided an IC card authentication method executed in an IC card in which value data representing an effective value and first authentication code generation data are stored, and an IC card processing device which processes the IC card and stores second authentication code generation data identical to the first authentication code generation data, comprising: the first step of generating random number data; the second step of processing the value data stored in the IC card and the random number data generated in the first step, by using the first authentication code generation data stored in the IC card to generate first authentication code; the third step of processing the value data stored in the IC card and the random number data generated in the first step, by using the second authentication code generation data stored in the IC card processing device to generate second authentication code; and the fourth step of comparing the first authentication code with the second authentication code to authenticate the IC card.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 20 is a view schematically showing a message output from the IC card;

FIG. 21 is a view schematically showing a key collation message;

FIG. 22 is a view schematically showing a data write message;

DETAILED DESCRIPTION OF THE INVENTION

An embodiment of the present invention will be described below with reference to the several views of the accompanying drawing.

FIGS. 1 to 12 are views for explaining an IC card, an IC card issuing unit, a telephone set, and a switching unit. The telephone set is a terminal device which directly handles the IC card. The switching unit intermediates between telephone sets. An IC card processing system according to an embodiment of the present invention is constituted by the IC card, the IC card issuing unit, the telephone set, and the switching unit. This embodiment will exemplify the case of applying the IC card processing system of the present invention to a public telephone system. The public telephone system in this embodiment is a system in which the telephone set can be used in exchange for message rate information (value data) recorded on the IC card.

Figure 1:
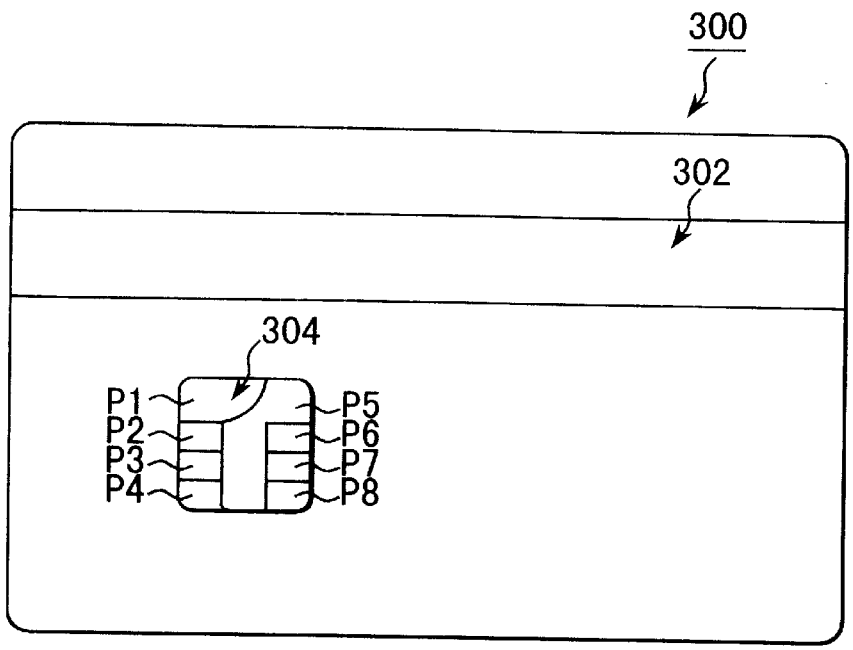
FIG. 1 is view for schematically explaining an IC card.

The IC card will be schematically explained with reference to FIG. 1.

An IC card 300 has a magnetic stripe 302 and an IC module 304. The IC card 300 is formed based on ISO standards or the like.

The IC module 304 will be briefly described. The IC module 304 has, e.g., 8 pins P1 to P8. The pin P1 is a terminal for supplying an operation current to the card from a card reader/writer (to be described later). The pin P2 is a terminal for supplying a reset signal from the card reader/writer to the card. The pin P3 is a terminal for supplying an operation clock from the card reader/writer. The pin P5 is a ground terminal. The pin P7 is a terminal for supplying a write voltage from the card reader/writer. The pin P8 is a terminal functioning as a bidirectional serial data transmission path.

Figure 2:
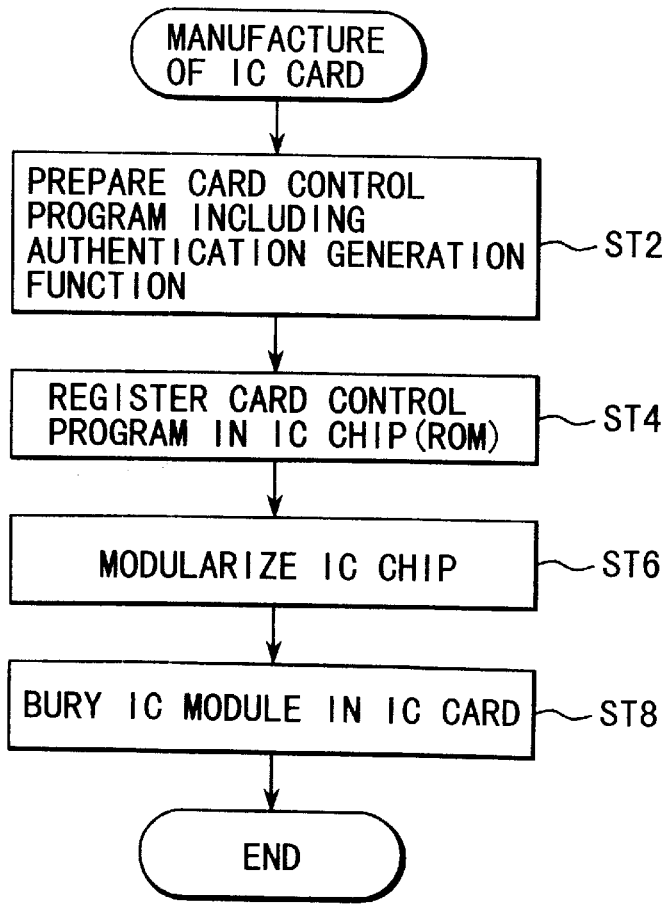
FIG. 2 is a flow chart for explaining a procedure of manufacturing the IC card.

A procedure of manufacturing the IC card 300 will be explained with reference to FIG. 2.

Figure 3:
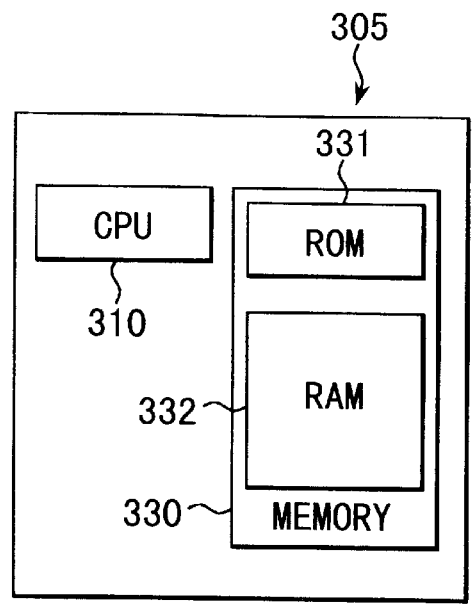
FIG. 3 is a view for explaining the schematic arrangement of an IC chip.

As shown in FIG. 3, an IC chip 305 serving as the basic component of the IC module 304 includes an IC card CPU 310 serving as an arithmetic element, and a memory 330 having a ROM 331 and a RAM 332. The IC card CPU 310 functions as a data generation means for generating various data (authenticators) on the basis of various data (message rate information and the like) stored in the memory 330. The memory 330 stores a card control program.

In manufacturing the IC card 300, a card control program including an authenticator generation function (authentication code generation data) is prepared (ST2). The authenticator generation function is data used to generate an authenticator (authentication code) necessary for authentication of the IC card. The card control program generated in ST2 is registered in the IC chip 305 (ROM 331; ST4). The IC chip 305 in which the card control program is registered is modularized (ST6). The modularized IC chip, i.e., the IC module 304 is buried in the IC card 300 (ST8). In this manner, the IC card is manufactured.

An issuing unit 200 for issuing the IC card will be described below with reference to FIG. 4.

Figure 4:
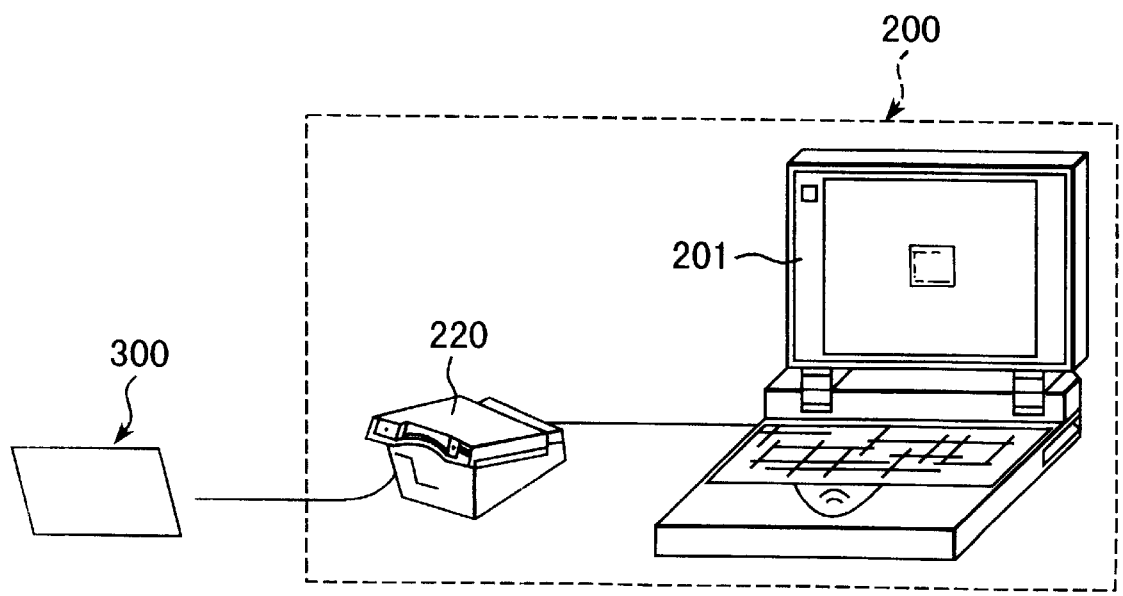
FIG. 4 is a view for schematically explaining an issuing unit for issuing the IC card.

As shown in FIG. 4, the issuing unit 200 has a reader/writer 220 and a personal computer (PC) 201. The reader/writer 220 writes data in the IC card 300 and reads data written in the IC card 300. The PC 201 controls the reader/writer 220.

The function of the issuing unit 200 (to be described below) is realized by the control program of an issuing unit CPU 210 (see FIGS. 14, 16, and 18) for controlling the PC 201.

If many IC cards must be successively issued, a structure of successively issuing IC cards is added.

Figure 5:
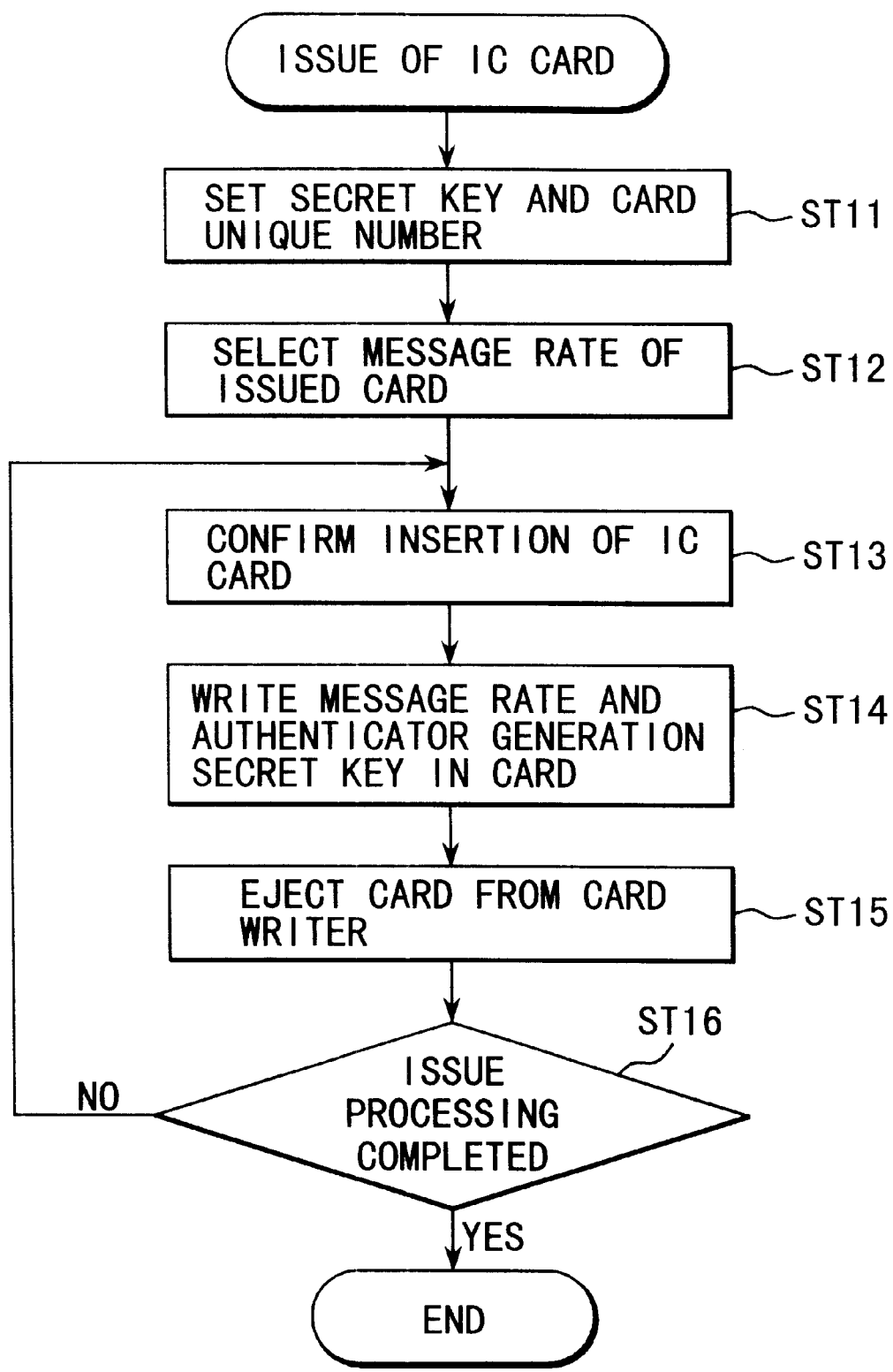
FIG. 5 is a flow chart for explaining issue of the IC card by the issuing unit.

Issue of the IC card by the issuing unit 200 will be explained with reference to FIG. 5.

A secret key (key data) for generating an authenticator, and a card unique number unique to the card are set (ST11). Several methods of setting the secret key will be described. First, the secret key is set using the keyboard of the PC 201. That is, the user inputs a secret key via the keyboard to set the input secret key. Second, the secret key is set using a storage medium (setting IC card or the like) storing the secret key, and the reader/writer 220. That is, a secret key stored in the storage medium is read using the reader/writer 220 to set the read secret key. Third, the secret key is included in the control program of an issuing unit CPU 230 (see FIGS. 14, 16, and 18) of the PC 201 in advance.

Message rate information (rate of 50, 100, or the like) to be set in the IC card is selected (ST12). When many IC cards are successively issued, the issuing unit 200 may be prepared for each message rate information to fix the message rate information processed by each issuing unit.

Upon setting the secret key, and selecting the message rate information, the card issue preparation is made. The flow waits for insertion of the IC card into the reader/writer 220. When an IC card is inserted into the reader/writer 220, and insertion of the card is confirmed (ST13), the secret key set in ST11 and the message rate information selected in ST12 are written in the IC card (ST14). Then, the IC card is ejected from the reader/writer 220 (ST15), and issue of one IC card is complete. By repeatedly performing ST13 to ST15, IC cards are issued from one to another (ST16).

Figure 6:
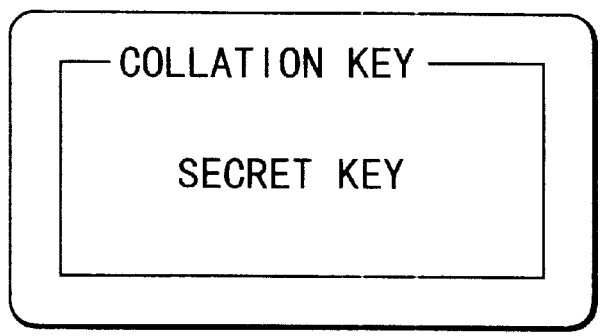
FIG. 6 is a view for explaining a setting IC card.

The setting IC card will be described with reference to FIGS. 6 to 8.

The setting IC card is used to set privacy data required in the IC card processing system, e.g., data such as the secret key in the system. By using this setting IC card, the privacy data can be safely set in the system. When the secret key is manually input and set, an input error may occur. However, if the setting IC card is used, no input error occurs. The safety of the privacy data recorded on the setting IC card is held as follows.

Limitation on read of the secret key from the setting IC card will be explained. In reading the secret key from the setting IC card by the issuing unit 200, the validity of the issuing unit 200 is confirmed. At first, the issuing unit 200 sends key data stored as part of the program of the issuing unit 200 to the setting IC card. The key data sent from the issuing unit 200 is collated by a collating key stored in the setting IC card. If the key data sent from the issuing unit 200 is authentic data, the key data coincides with the collating key. Only when the key data coincides with the collating key, read of the secret key is permitted (FIG. 6). In this manner, read of the secret key stored in the setting IC card is limited.

Figure 7:
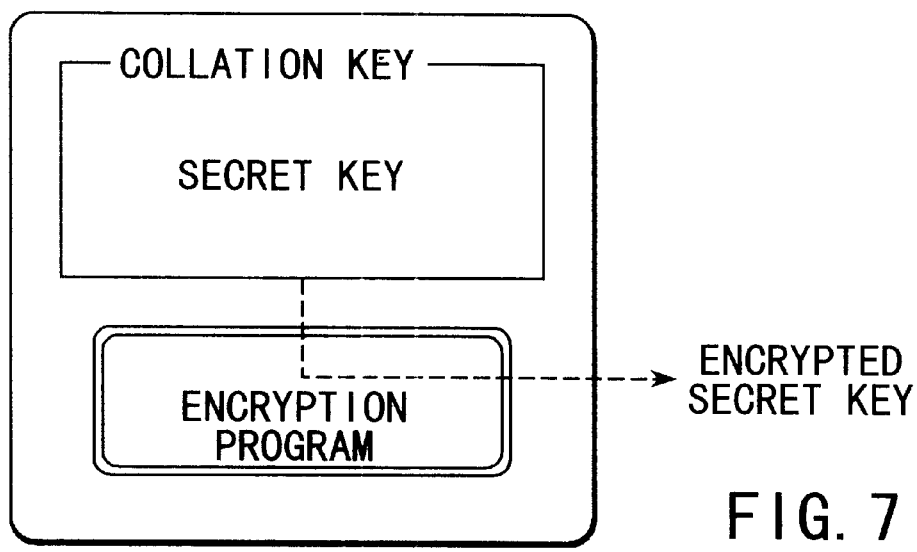
FIG. 7 is a view for explaining the setting IC card.
Figure 8:
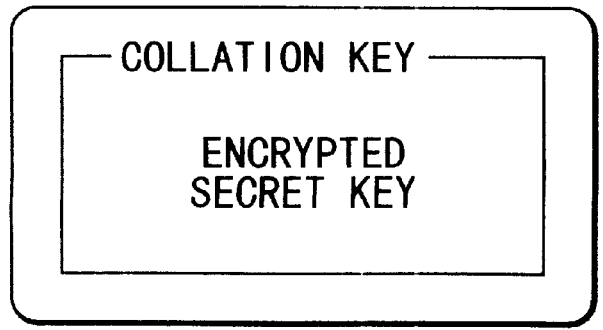
FIG. 8 is a view for explaining the setting IC card.

In addition to the above read limitation, the safety of the secret key can be further ensured by using encryption and decryption (FIGS. 7 and 8). An encryption function (encryption program) is given to the setting IC card, whereas a decryption function (decryption program) is to the issuing unit 200. The secret key stored in the setting IC card is encrypted by the encryption function of the setting IC card (FIG. 7). The encrypted secret key is transmitted from the setting IC card to the issuing unit 200. The encrypted secret key is decrypted by the decryption function of the issuing unit 200.

Although the case of encrypting the secret key by the setting IC card has been described above, the encrypted secret key may be stored in the setting IC card in advance. In this case, no encryption function need be set in the setting IC card.

The above-described function of preparing the setting IC card may be given to the issuing unit 200, or an issuing unit for issuing the setting IC card may be separately prepared. By using mutual authentication for confirmation of the validity between the issuing unit 200 and the setting IC card, a false secret key can be prevented from being set in the issuing unit 200 by a false setting IC card. If the false secret key is set in the issuing unit 200, a normally unusable IC card having the false secret key set therein appears on the market to degrade the reliability of the IC card processing system. It is difficult to analyze the IC card processing system and forge an IC card capable of using the system without any permission. Compared to this, the setting IC card for outputting a false secret key is relatively easily forged. To prevent the reliability of the system from degrading owing to the false setting IC card, mutual authentication is performed between the issuing unit 200 and the setting IC card.

Figure 9:
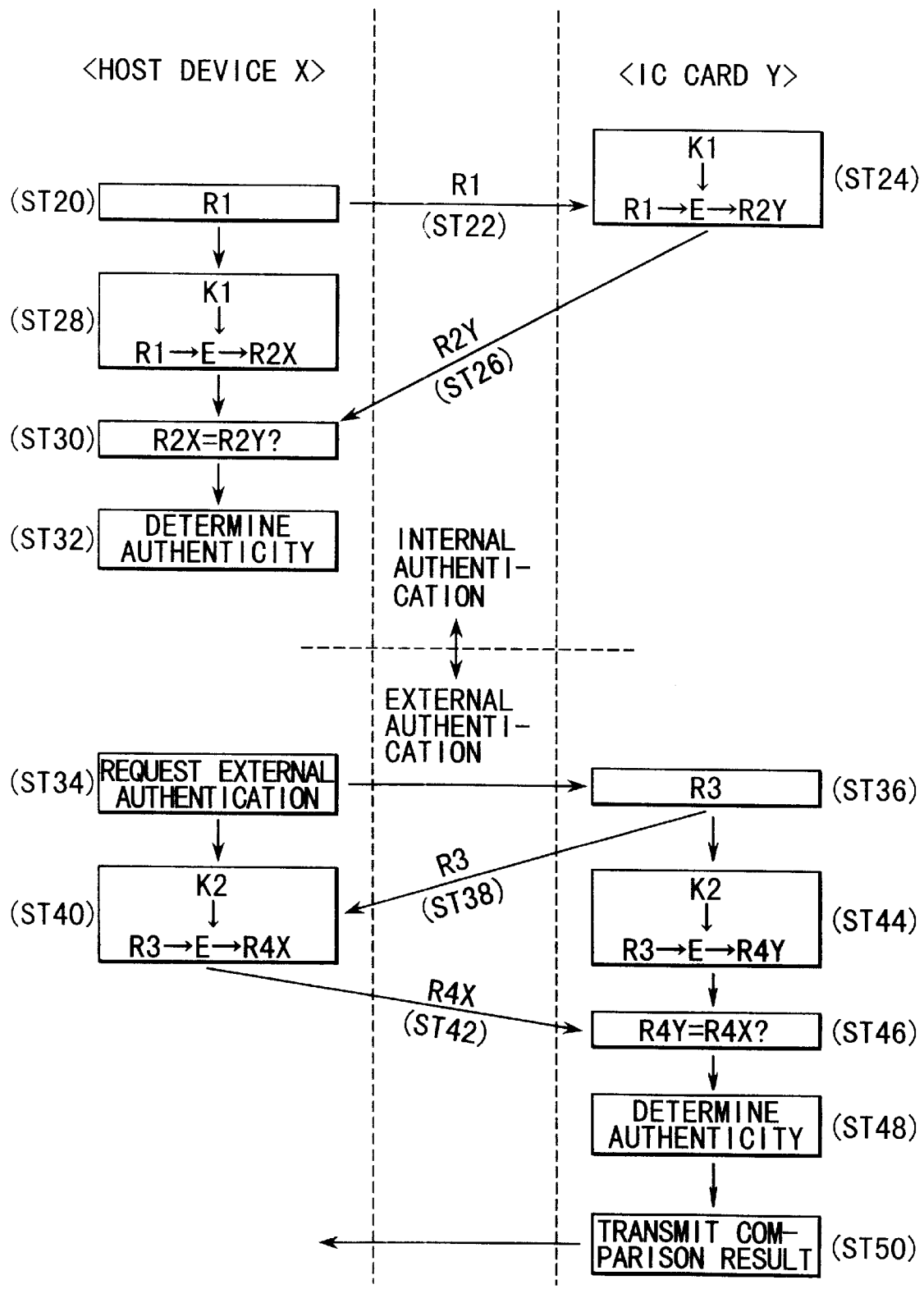
FIG. 9 is a view for explaining mutual authentication.

A mutual authentication procedure will be explained with reference to FIG. 9. Mutual authentication between a host device X and an IC card Y will be exemplified.

First, internal authentication (authentication processing on the host device X side) will be described. On the host device X side, a random number R1 is generated (ST20). The random number R1 is sent to the IC card Y (ST22). On the IC card Y side, the random number R1 is encrypted by a preset internal authentication key K1 using encryption data E, thereby generating an encrypted key R2Y (ST24). The encrypted key R2Y is sent from the IC card Y side to the host device X side (ST26).

Also on the host device X side, the random number R1 is encrypted by the preset internal authentication key K1 using the encryption data E, generating encrypted key R2X (ST28). The encrypted key R2X generated by the host device X is compared with the encrypted key R2Y generated on the IC card Y side (ST30). From the comparison result, the host device X side determines whether the IC card Y is authentic/false (ST32). That is, if the encrypted key R2X=R2Y, the IC card Y is determined to be authentic.

Second, external authentication (authentication processing on the IC card Y side) will be described. The host device X side outputs an external authentication request to the IC card Y (ST34). In accordance with this request, a random number R3 is generated on the IC card Y side (ST36). The generated random number R3 is sent to the host device X (ST38). On the host device X side, the random number R3 is encrypted by a preset external authentication key K2 using the encryption data E to generate an encrypted key R4X (ST40). The encrypted key R4X generated is transmitted from the host device X side to the IC card Y side (ST42).

Also on the IC card Y side, the random number R3 is encrypted by the preset external authentication key K2 using the encryption data E, thereby generating an encrypted key R4Y (ST44). The encrypted key R4Y generated is compared with the encrypted key R4X generated by and sent from the host device X side (ST46). From the comparison result, the IC card Y side determines whether the host device X is authentic/false (ST48). That is, if the encrypted key R4X=R4Y, the host device X is determined to be authentic. When the host device X is determined to be authentic, read of data from the IC card Y is permitted, and the comparison result is transmitted as a response to the host device X (ST50).

The timing to set, in the IC card, the card control program including the secret key, the message rate information, and the authenticator generation function is not limited to the above one. For example, the message rate information may be included in the card control program. Alternatively, only the card unique number may be included in the card control program, and the remaining data may be set in the issuing unit 200.

A telephone set 400 will be described with reference to FIG. 10.

Figure 10:
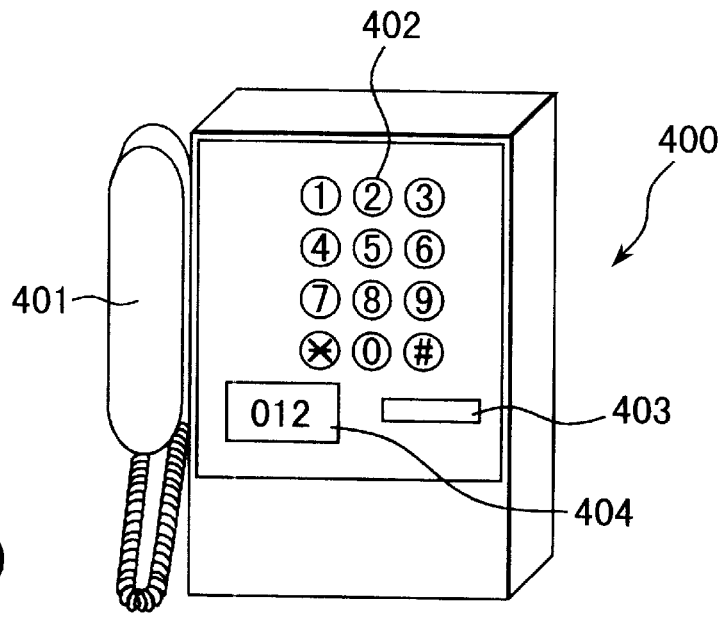
FIG. 10 is a view for schematically explaining a telephone set.

As shown in FIG. 10, the telephone set 400 has a handset 401, push buttons 402, a card slot 403, and a display 404. The card slot 403 accepts insertion of the IC card 300, and returns the IC card 300. The display 404 displays the remaining message rate recorded on the IC card 300.

Figure 11:
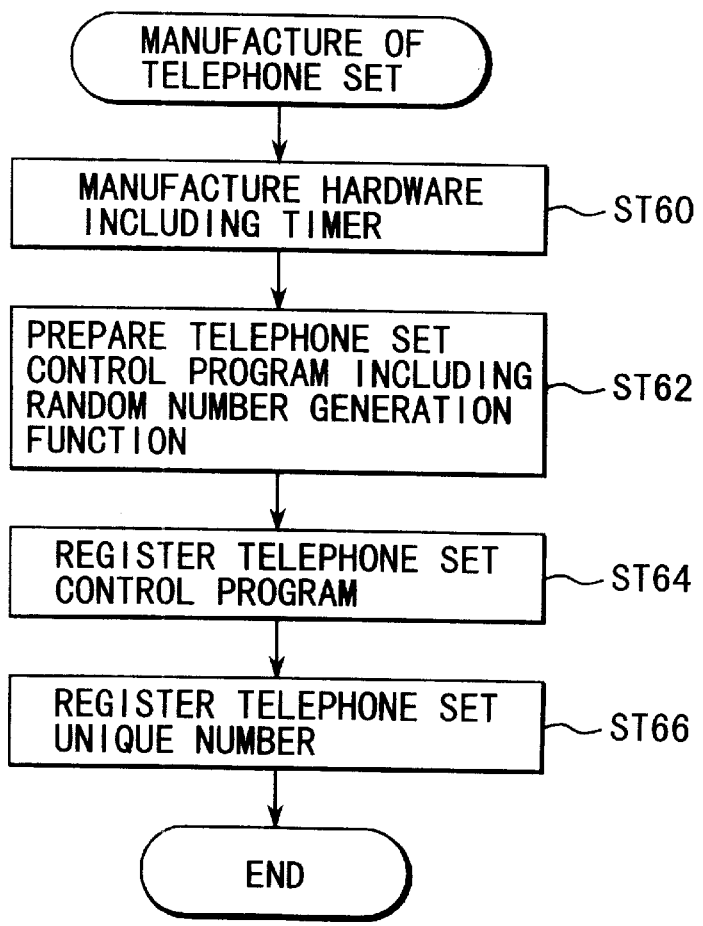
FIG. 11 is a flow chart for explaining a procedure of manufacturing the telephone set.

A procedure of manufacturing the telephone set 400 will be described with reference to FIG. 11.

Hardware of a telephone set including a timer is manufactured (ST60). A telephone set control program including a random number generation program for generating a random number, an access program necessary for an access to the card, and a communication program for performing data communication with a switching unit 500 is prepared (ST62).

The telephone set control program prepared in this way is registered in the hardware of the telephone set 400 manufactured in ST60 (ST64). This registration is completed by inserting a ROM having the telephone set control program written therein into a ROM socket on the control board of the telephone set 400. Alternatively, the registration is completed by writing the telephone set control program by communication in a memory arranged on the hardware of the telephone set 400.

Upon completion of the registration of the telephone set control program, a telephone set unique number (device unique data/terminal unique data) unique to each telephone set is registered in the hardware of the telephone set (ST68). This registration is performed with, e.g., the push buttons 402 of the telephone set 400.

An example of registration of the telephone set unique number will be described in short. The telephone set 400 in which the telephone set control program is registered is powered on. At this time, if no telephone set unique number is registered in the telephone set 400, the telephone set unique number registration mode is executed. Then, "---" is displayed on the display 404. If a button 402 is depressed, a number corresponding to the button 402 is displayed on the right side in the display 404. For example, upon depressing a button 402 corresponding to "1", "--1" is displayed on the display 404. If a button 402 corresponding to "2" is depressed, "-12" is displayed on the display 404. If a button 402 corresponding to "3" is depressed, "123" is displayed on the display 404. Further, if a button 402 corresponding to "4" is depressed, "234" is displayed on the display 404. When input of a telephone set unique number having a predetermined digit is complete, a button 402 corresponding to "*" must be depressed. Upon depressing the button 402 corresponding to "*", the display of the display 404 flickers. After the input telephone set unique number is confirmed, a button 402 corresponding to "#" must be depressed. If the button 402 corresponding to "#" is depressed, the input telephone set unique number is defined. That is, the input telephone set unique number is written in the ROM of the telephone set 400. Upon completion of the registration of the telephone set unique number in this manner, the standard operation of a card type telephone set is executed in the telephone set 400.

When the telephone set 400 is powered on again after turning off the power supply to the telephone set 400, the registered state of the telephone set unique number is checked in accordance with the telephone set control program. If the registration of the telephone set unique number is confirmed by this check, the telephone set unique number registration mode is skipped, and the standard operation of the card type telephone set is executed.

In addition to the above method, the telephone set unique number may be registered with a voice using the handset 401, by using a communication line, or as part of the telephone set control program. The telephone set 400 completed through these steps is installed as a public telephone at each location.

The switching unit 500 will be described below with reference to FIG. 12.

Figure 12:
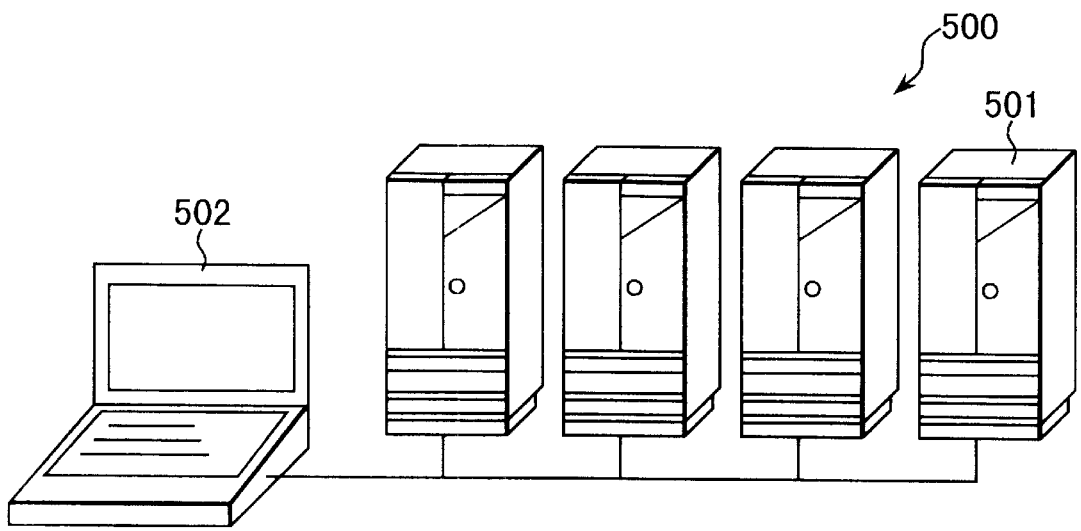
FIG. 12 is a view for schematically explaining a switching unit.

As shown in FIG. 12, the switching unit 500 includes switching unit main bodies 501 and a personal computer (PC) 502. The PC 502 controls the switching unit main bodies 501.

Figure 13:
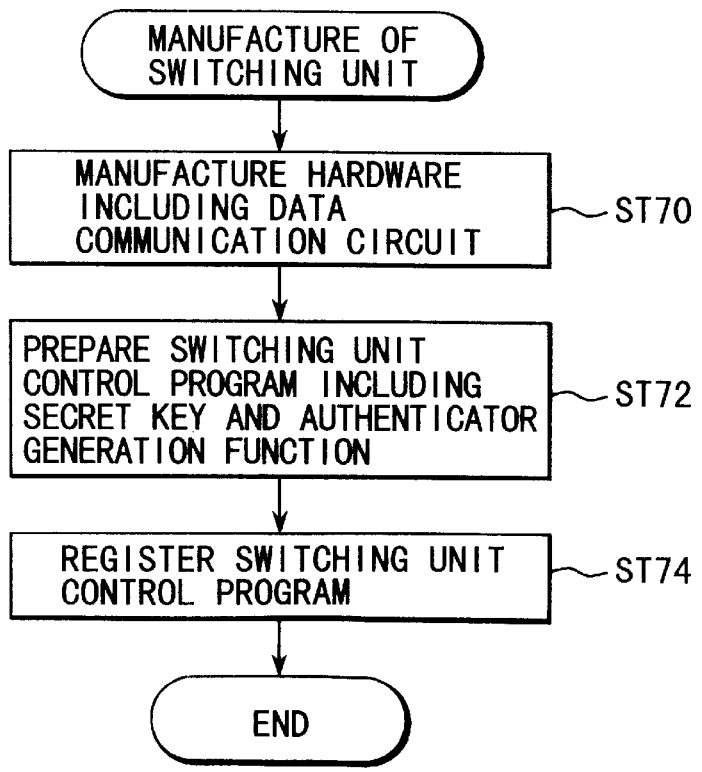
FIG. 13 is a flow chart for explaining a procedure of manufacturing the switching unit.

A procedure of manufacturing the switching unit 500 will be explained with reference to FIG. 13.

The procedure of manufacturing the switching unit 500 is basically the same as that of the telephone set 400. That is, hardware and software for realizing the function applied in this embodiment are added to hardware and software serving as the fundamental arrangement of the switching unit.

Hardware of the switching unit main body 501 including an interface for communicating with the telephone set 400 is manufactured (ST70). A switching unit control program including a secret key identical to the secret key registered in the IC card 300, an authenticator generation function identical to the authenticator generation function registered in the IC card 300, and a communication program for performing data communication with the telephone set 400 is prepared (ST72).

The switching unit control program prepared in this way is registered in the hardware of the switching unit main body 501 manufactured in ST70 (ST74). The registration is completed by inserting a ROM having the switching unit control program written therein into a ROM socket on the control board of the switching unit main body 501. Alternatively, the registration is completed by writing the switching unit control program by communication in a memory arranged on the hardware of the switching unit main body 501.

The switching unit 500 completed through these steps is installed in a security-ensured environment where the switching unit 500 cannot be accessed except for the manager.

The first to third embodiments of the IC card processing system as the point of the present invention will be described below.

Figure 14:
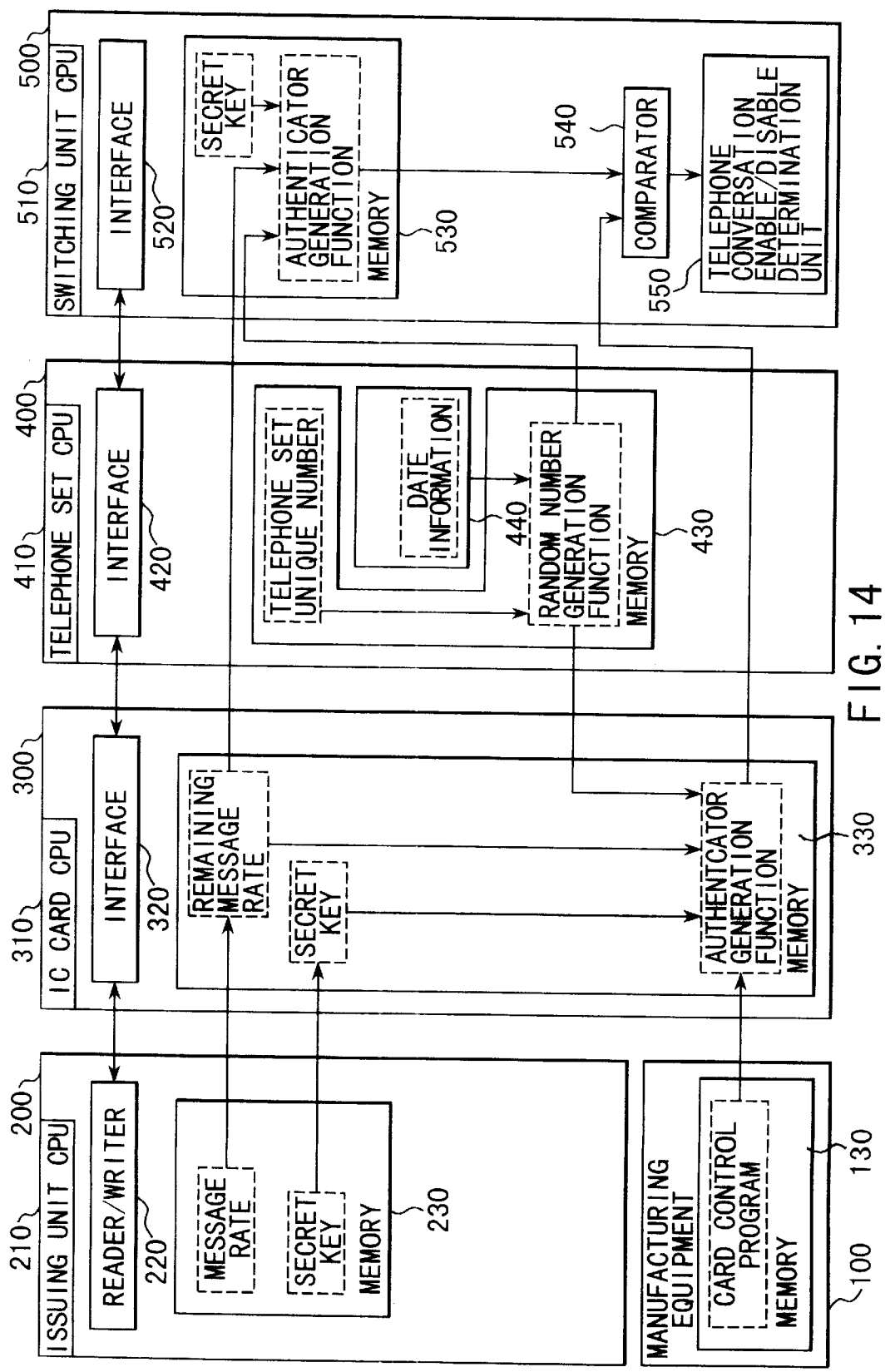
FIG. 14 is a view for schematically explaining an IC card processing system according to the first embodiment of the present invention.

The first embodiment will be described with reference to FIG. 14.

An IC card 300 is manufactured by manufacturing equipment 100. In the IC card manufacturing process, a card control program including an authenticator generation function is prepared. The card control program is registered in a memory 330 of an IC chip 305. The IC chip 305 is modularized. An IC module 304 is buried in an IC card to manufacture the IC card 300. That is, in the IC card manufacturing process, the authenticator generation function is registered in the memory 330 of the IC card 300.

Issue processing is performed by an issuing unit 200 for the IC card 300 manufactured through the above manufacturing process. The issuing unit 200 is controlled by an issuing unit CPU 210. An issuing unit control program for controlling the issuing unit CPU 210, and various data (message rate information and secret key) set in the IC card are stored in a memory 230. In the first embodiment, the issuing unit control program assumes to include the secret key. Message rate information and a secret key are registered in the IC card 300 by a card reader/writer 220 of the issuing unit 200.

The IC card 300 having undergone the manufacturing process and the issue processing will be explained. The IC card 300 is controlled by an IC card CPU 310. A card control program for controlling the IC card CPU 310, and the message rate information and secret key registered by the issuing unit 200 are stored in the memory 330. At that time, the card control program includes the authenticator generation function. The IC card 300 comprises an interface 320 for transferring various data between the IC card 300 and a telephone set 400.

The telephone set 400 serving as a terminal device for handling the IC card 300 will be explained. The telephone set 400 is manufactured through the manufacturing process described above. The telephone set 400 is controlled by a telephone set CPU 410. A telephone set control program for controlling the telephone set CPU 410, and a telephone set unique number are stored in a memory 430. The telephone set CPU 410 functions as a data generation means for generating various data (random numbers) on the basis of various data (telephone set unique number and the like) stored in the memory 430. In the first embodiment, the telephone set control program assumes to include a random number generation function. A timer 440 for supplying date information is mounted on the telephone set 400. Based on the date information supplied from the timer 440, and the telephone set unique number stored in the memory 430, a random number is generated by the random number generation function included in the telephone set control program stored in the memory 430. The telephone set 400 comprises an interface 420 for transferring various data between the telephone set 400 and a switching unit 500.

The switching unit 500 for connecting telephone sets to each other will be described. The switching unit 500 is manufactured through the manufacturing process described above. That is, the switching unit 500 is controlled by a switching unit CPU 510. A control program for controlling the switching unit CPU 510, and a secret key identical to the secret key stored in the memory 330 of the IC card 300 are stored in a memory 530. The switching unit CPU 510 functions as a data generation means for generating various data (authenticators) on the basis of various data stored in the memory 530. In the first embodiment, the switching unit control program includes the same authenticator generation function as the authentication generation function included in the card control program. A comparator 540 and a determination unit 550 are arranged in the switching unit 500. The comparator 540 compares an authenticator generated by the authenticator generation function in the memory 530 with an authenticator generated by the authenticator generation function in the memory 330 of the IC card 300. The determination unit 550 determines from the comparison result of the comparator 540 whether telephone conversation using the IC card 300 is enabled/disabled. The switching unit 500 comprises an interface 520 for transferring various data between the switching unit 500 and the telephone set 400.

Figure 15:
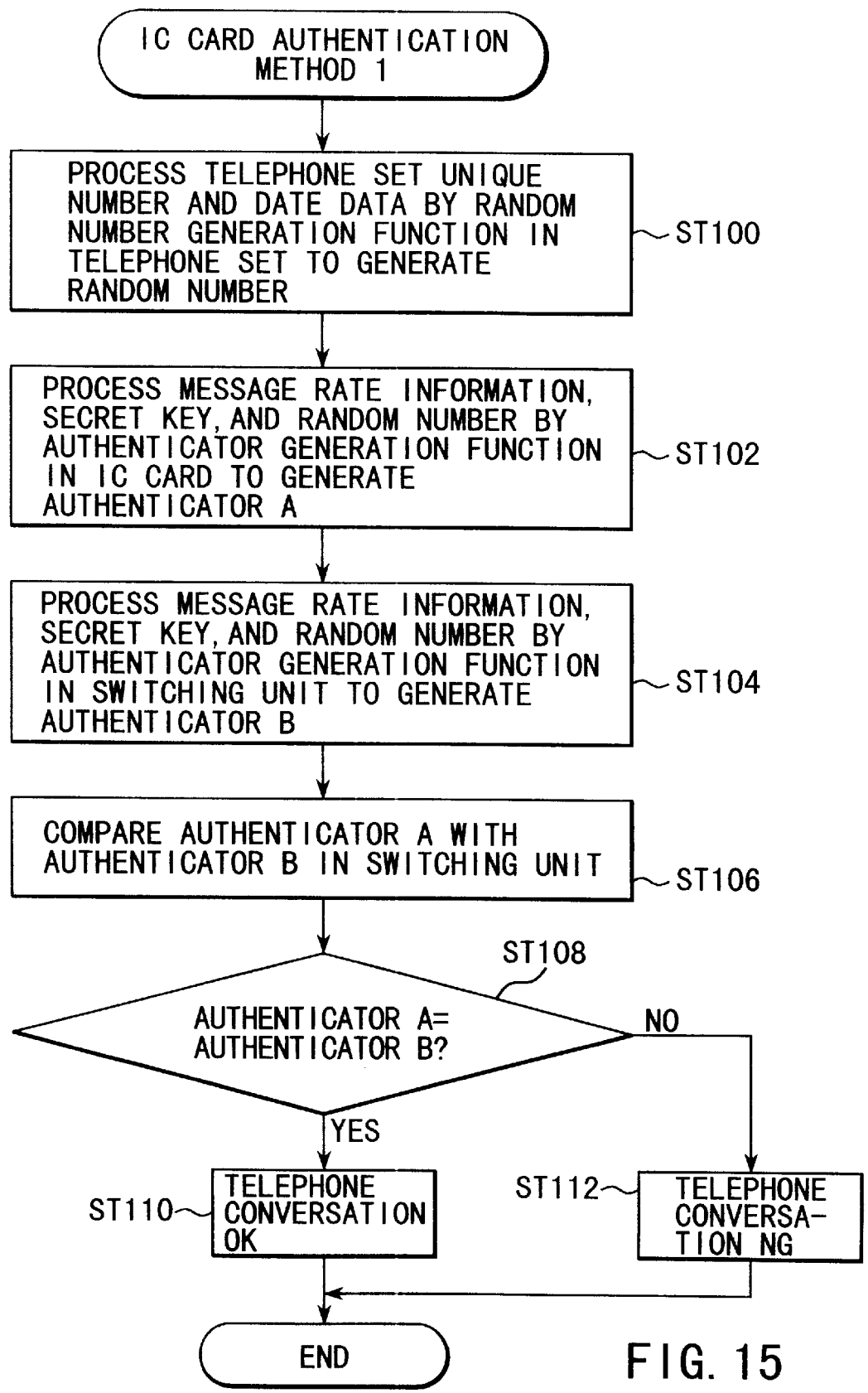
FIG. 15 is a flow chart for explaining a card authentication method according to the first embodiment of the present invention.

A card authentication method in the first embodiment will be described below with reference to FIG. 15.

For example, when the IC card 300 is inserted in the telephone set 400, the telephone set 400 generates a random number from the telephone set unique number in the memory 430, and date information supplied from the timer 440 by using the random number generation function in the memory 430 (ST100). The generated random number is sent to the IC card 300 and the switching unit 500. Since the date information supplied from the timer 440 changes for each IC card 300, the random number also changes for each IC card 300.

The card 300 which has received the random number generated by the telephone set 400 generates an authenticator from the random number, and the secret key and message rate information in the memory 330 by using the authenticator generation function in the memory 330 (ST102). The generated authenticator is sent to the telephone set 400 together with the message rate information in the memory 330.

The telephone set 400 which has received the message rate information and authenticator sent from the IC card 300 transmits them to the switching unit 500 together with the random number generated in advance and sent to the IC card 300.

The switching unit 500 is installed in a telephone office or a switching center, and is a kind of line switching equipment. The switching unit 500 generates an authenticator from the message rate information and random number sent from the telephone set 400 by using the authenticator generation function and secret key in the memory 530 (ST104). The switching unit 500 compares, using the comparator 540, the authenticator generated by the switching unit 500 with the authenticator sent via the telephone set 400 (ST106). From the comparison result of the comparator 540, the telephone conversation enable/disable determination unit 550 determines whether telephone conversation using the IC card inserted in the telephone set 400 is enabled/disabled. For example, if the authenticator generated by the switching unit 500 coincides with the authenticator sent via the telephone set 400 (YES in ST108), telephone conversation (transaction) using the IC card inserted in the telephone set 400 is permitted to connect a line (ST110). If they do not coincide with each other (NO in ST108), no telephone conversation (transaction) using the IC card inserted in the telephone set 400 is permitted (ST112).

Figure 16:
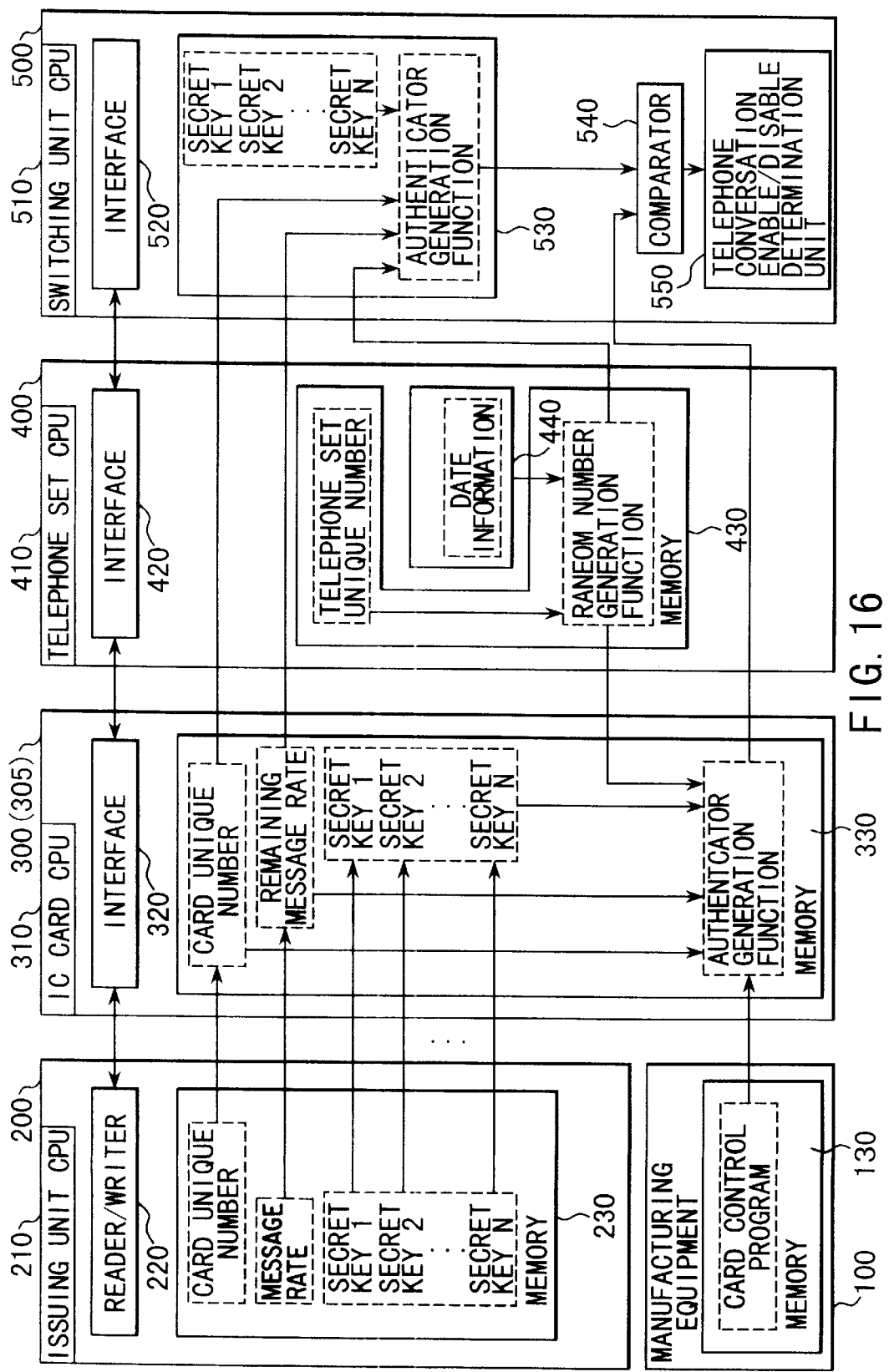
FIG. 16 is a view for schematically explaining an IC card processing system according to the second embodiment of the present invention.
Figure 17:
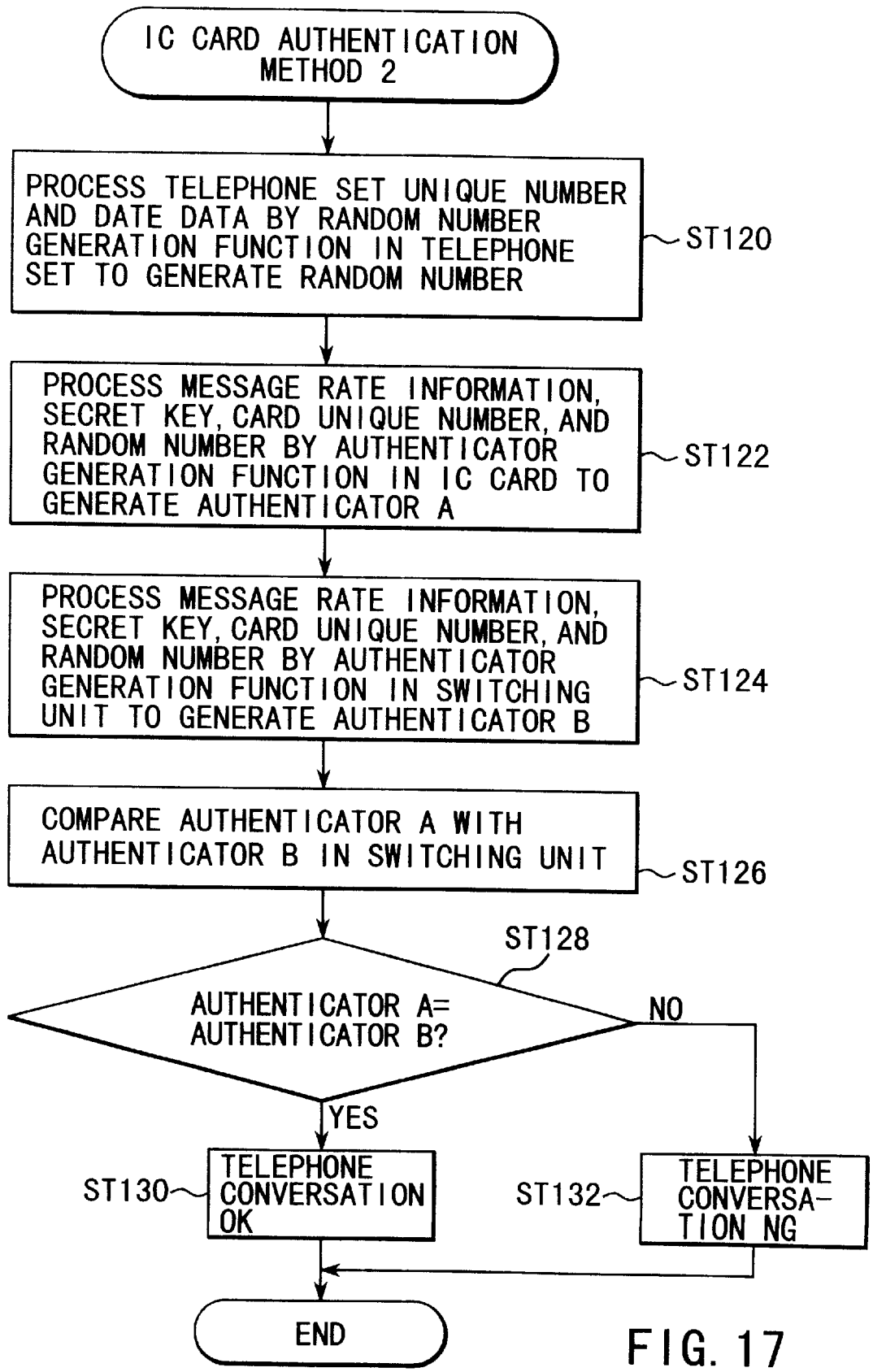
FIG. 17 is a flow chart for explaining a card authentication method according to the second embodiment of the present invention.

The second embodiment will be described with reference to FIG. 16.

To further enhance the security described in the first embodiment, the second embodiment uses a card unique number unique to each IC card 300 in generating an authenticator. The card unique number is added to the IC card 300 in issue processing by an issuing unit 200, and stored in a memory 330 of the IC card 300.

More specifically, in manufacturing or issuing an IC card, a card unique number is set for each IC card. The card unique number is used to generate an authenticator in the IC card 300 and a switching unit 500. For this purpose, the card unique number set in the IC card 300 inserted in a telephone set 400 must be sent to the switching unit 500. The card unique number is sent to the switching unit 500, similarly to transmission of message rate information and the like to the switching unit 500 in the first embodiment described above. Accordingly, the authenticator output from the IC card 300 and transmitted via a telephone line can be further complicated.

In the second embodiment, to further enhance the security described in the first embodiment, a plurality of secret keys are registered in both the IC card 300 and the switching unit 500, and a predetermined secret key is used as needed. That is, a plurality of secret keys: the first secret key, the second secret key, . . . , are registered in the IC card 300. A plurality of secret keys: the third secret key identical to the first one, the fourth secret key identical to the second one, . . . , are registered in the switching unit 500. When the first secret key is used in the IC card 300, the third one is used in the switching unit 500; when the second secret key is used in the IC card 300, the fourth one is used in the switching unit 500. A plurality of pairs of secret keys are stored in a memory 330 of the IC card 300 and a memory 530 of the switching unit 500, similar to the first embodiment.

Assume that secret keys $K1, K2, \ldots, Kn, \ldots, KN$ are registered in both the IC card 300 and the switching unit 500.

At first, an operation starts with a secret key Ka ($1 \leq a \leq N$) in both the IC card 300 and the switching unit 500. When a predetermined time has elapsed, or the secret key Ka may leak out, the switching unit 500 transmits an application instruction for a secret key Kb ($1 \leq b \leq N$, $b \neq a$) to the IC card 300 via the telephone set 400 upon inserting the IC card 300 into the telephone set 400. At this time, application of the secret key Kb also starts on the switching unit 500 side. The IC card 300 which has received the application instruction for the secret key Kb continuously applies the secret key Kb until it receives an application instruction for another secret key.

The switching unit 500 manages the secret key by the following method. First, secret keys identical to the secret keys K1 to KN stored in the IC card 300 are included in the switching unit control program, and a predetermined secret key is selected as needed. Second, only an applied secret key is held (sequentially rewritten). By these methods, the secret key becomes more difficult to analyze.

An application instruction (change instruction) for the secret key is output after a predetermined period (e.g., half a year). This is because the system is undesirably easily analyzed if the application instruction for the secret key permanently continues. An IC card 300 not used during the application instruction for the secret key, i.e., an IC card 300 not inserted into the telephone set 400 cannot be used upon a change in secret key. In this case, the IC card 300 is handled at the office counter.

The security of the IC card processing system according to the second embodiment is protected as follows.

A manufacturing equipment 100 registers a card control program including an authenticator generation function in the IC card 300. The issuing unit 200 registers a card unique number, a message rate, and secret keys 1 to N in the IC card 300. The secret keys are values determined in advance by any method.

For example, when the IC card 300 is inserted in the telephone set 400, the telephone set 400 generates a random number from a telephone set unique number in the memory 430 and date information supplied from a timer 440 by using the random number generation function in a memory 430 (ST120). The generated random number is sent to the IC card 300 and the switching unit 500. Since the date information supplied from the timer 440 changes for each IC card 300, the random number also changes for each IC card 300.

The card 300 which has received the random number generated by the telephone set 400 generates an authenticator from the random number, and the secret key, card unique number, and message rate information in the memory 330 by using the authenticator generation function in the memory 330 (ST122). The generated authenticator is sent to the telephone set 400 together with the message rate information and card unique number in the memory 330.

The telephone set 400 which has received the message rate information, card unique number, and authenticator sent from the IC card 300 transmits them to the switching unit 500 together with the random number generated in advance and sent to the IC card 300.

The switching unit 500 generates an authenticator from the message rate information, card unique number, and random number sent from the telephone set 400 by using an authenticator generation function and secret key in a memory 530 (ST124). The switching unit 500 compares, using a comparator 540, the authenticator generated by the switching unit 500 with the authenticator sent via the telephone set 400 (ST126). From the comparison result of the comparator 540, the telephone conversation enable/disable determination unit 550 determines whether telephone conversation using the IC card inserted in the telephone set 400 is enabled/disabled. For example, if the authenticator generated by the switching unit 500 coincides with the authenticator sent via the telephone set 400 (YES in ST128), telephone conversation (transaction) using the IC card inserted in the telephone set 400 is permitted to connect lines (ST130). If they do not coincide with each other (NO in ST128), no telephone conversation (transaction) using the IC card inserted in the telephone set 400 is permitted (ST132).

The card unique number is registered in manufacturing the IC card 300 or by the issuing unit 200.

Figure 18:
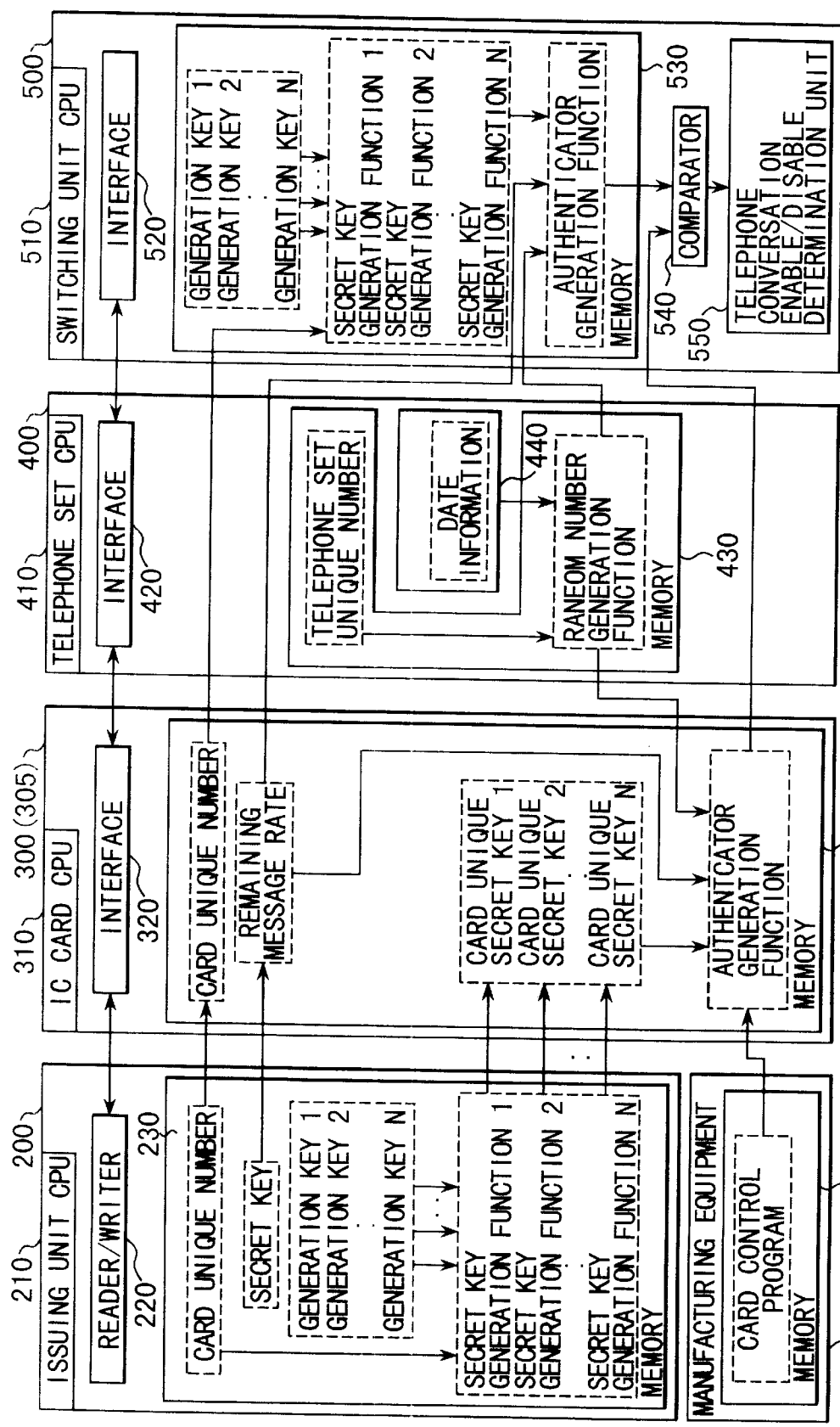
FIG. 18 is a view for schematically explaining an IC card processing system according to the third embodiment of the present invention.
Figure 19:
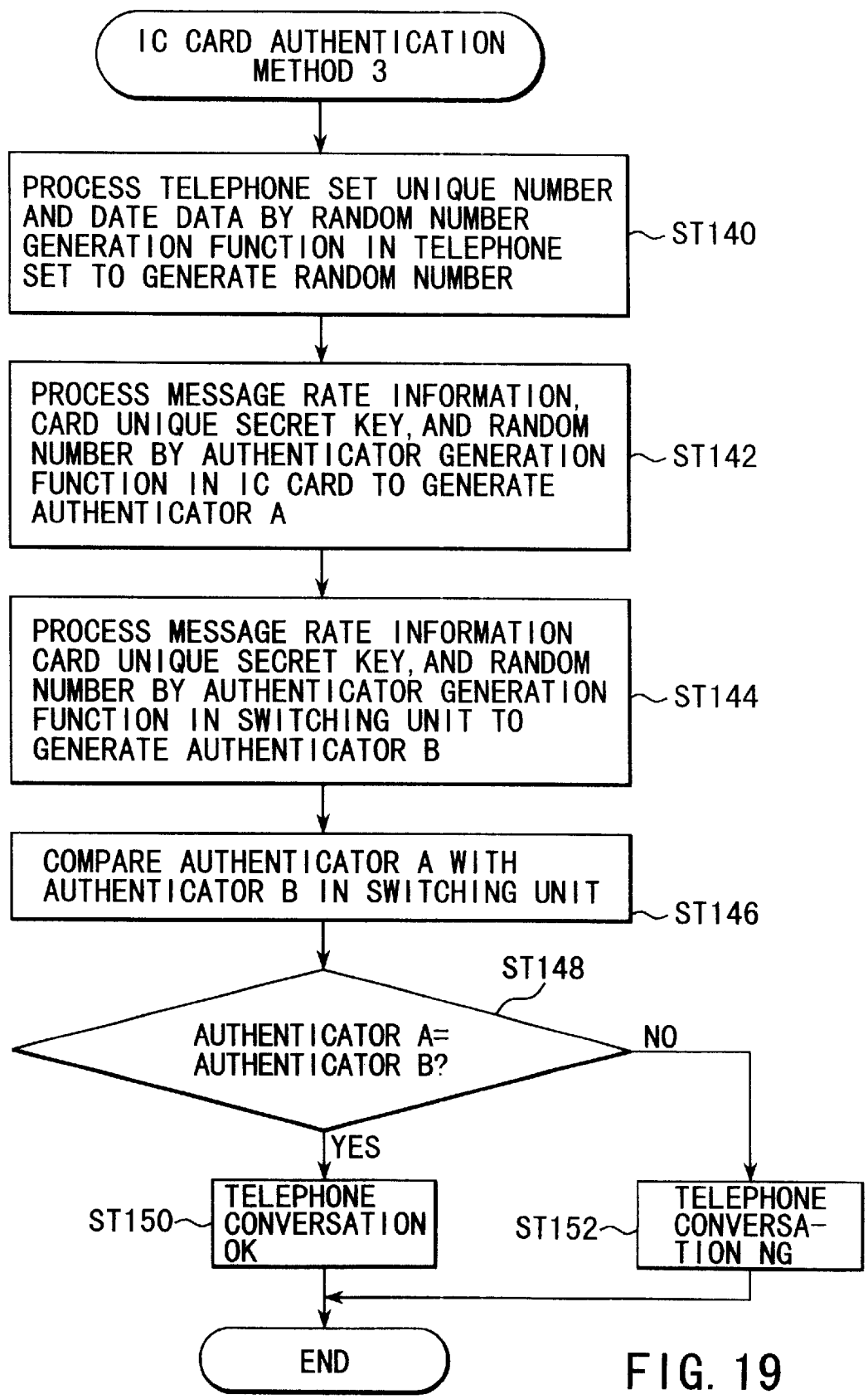
FIG. 19 is a flow chart for explaining a card authentication method according to the third embodiment of the present invention.

The third embodiment will be described with reference to FIG. 18.

In the third embodiment, to further enhance the security described in the first and second embodiments, the secret key is generated from the card unique number. In the following description, the secret key generated from the card unique number will be referred to as a card unique secret key.

For example, a generation logic expression (secret key generation function) and a generation key for the card unique secret key are set in both an issuing unit 200 and a switching unit 500. From the generation key and the card unique number, the card unique secret key is generated by the generation logic expression. That is, the card unique secret key stored in a memory 330 of an IC card 300 is generated by the generation logic expression in accordance with the card unique number and the generation key. In using the IC card 300, the switching unit 500 generates a card unique secret key using the generation logic expression in a memory 530 from the card unique number received from the IC card 300 via a telephone set 400 and the generation key in a memory 530 of the switching unit 500.

Accordingly, the card unique secret key stored in the card has a different value for each card to make it difficult to analyze the system. The generation logic expression and the generation key assume to be included in a card control program and a switching unit control program.

In the third embodiment, to further enhance the security described in the first and second embodiments, a plurality of generation keys are registered in both the IC card 300 and the switching unit 500, and a predetermined generation key is used as needed. That is, a plurality of generation keys: the first generation key, the second generation key, . . . , are registered in the IC card 300. A plurality of generation keys: the third generation key identical to the first one, the fourth generation key identical to the second one, . . . , are registered in the switching unit 500. When the first generation key is used in the IC card 300, the third one is used in the switching unit 500; when the second generation key is used in the IC card 300, the fourth one is used in the switching unit 500. A plurality of pairs of generation keys are stored in a memory 330 of the IC card 300 and a memory 530 of the switching unit 500, similar to the first embodiment.

For example, generation logic expression and generation keys K'1, K'2, . . . , K'n, . . . , K'N are registered in both the issuing unit 200 and the switching unit 500. Card unique secret keys K1, K2, . . . , Kn, . . . , KN are generated by card unique numbers, the generation keys K'1, K'2, . . . , K'n, . . . , K'N, and the generation logic expression.

In issuing a card, the card unique secret key Kn generated by processing the card unique number and the generation key K'n by the generation logic expression is set in the IC card 300. In using the IC card 300 in which the card unique secret key Kn is set, the card unique secret key Kn is generated in the switching unit 500 as follows. That is, in the switching unit 500, the card unique secret key Kn is generated from the card unique number sent from the IC card 300 via the telephone set 400 and the generation key K'n in the memory 530 of the switching unit 500 by using the generation logic expression in the memory 530. The value n described above properly changes, similar to the second embodiment.

The switching unit 500 manages the secret key by the following method. First, a generation key identical to the generation key K'n stored in the IC card 300 is included in a switching unit control program, and a predetermined generation key is selected as needed. Second, only the applied generation key K'n is held (sequentially rewritten). By these methods, the system becomes more difficult to analyze.

Moreover, in the third embodiment, to further enhance the security described in the first and second embodiments, different generation logic expressions are applied for respective generation keys to generate card unique secret keys. That is, a plurality of generation logic expressions, i.e., the first generation logic expression, the second generation logic expression, . . . , are registered in the issuing unit 200. A plurality of generation logic expressions, i.e., the third generation logic expression identical to the first one, the fourth generation logic expression identical to the second one, . . . , are registered in the switching unit 500. If the first generation logic expression is used in the IC card 300, the third one is used in the switching unit 500; if the second generation logic expression is used in the IC card 300, the fourth one is generated in the switching unit 500. A plurality of pairs of generation logic expressions are stored in a memory 230 of the issuing unit 200 and the memory 530 of the switching unit 500.

For example, generation logic expressions L1, L2, . . . , Ln, . . . , LN and the generation keys K' are registered in both the issuing unit 200 and the switching unit 500. The card unique secret keys K1, K2, . . . , Kn, . . . , KN are generated by card unique numbers, the generation keys K' and the generation logic expressions L1, L2, . . . , Ln, . . . , LN.

In issuing a card, the card unique secret key Kn generated by processing the card unique number and the generation key K' by the generation logic expression Ln is set in the IC card 300. In using the IC card 300 in which the card unique secret key Kn is set, the card unique secret key Kn is generated in the switching unit 500 as follows. That is, in the switching unit 500, the card unique secret key Kn is generated from the card unique number sent from the IC card 300 via the telephone set 400 and the generation key K' in the memory 530 of the switching unit 500 by using the generation logic expression Ln in the memory 530. The value n described above properly changes, similar to the second embodiment.

The switching unit 500 manages the secret key by the following method. First, a generation key and generation logic identical to the generation key K' and generation logic Ln stored in the IC card 300 are included in a switching unit control program, and a predetermined generation logic expression is selected as needed. Second, only the applied generation logic expression is held (sequentially rewritten). By these methods, the system becomes more difficult to analyze.

In addition, in the third embodiment, to further enhance the security described in the first and second embodiments, different generation logic expressions are applied for different generation keys to generate card unique secret keys. That is, a plurality of generation keys: the first generation key, the second generation key, . . . , and a plurality of generation logic expressions: the first generation logic expression, the second generation logic expression, . . . , are registered in the issuing unit 200. A plurality of generation keys, i.e., the third generation key identical to the first one, the fourth generation key identical to the second one, . . . , are registered in the switching unit 500. A plurality of generation logic expressions, i.e., the third generation logic expression identical to the first one, the fourth generation logic expression identical to the second one, . . . , are registered in the switching unit 500. When the first generation key and logic are used in the IC card 300, the third generation key and logic are used in the switching unit 500; when the second generation key and logic are used in the IC card 300, the fourth generation key and logic are generated in the switching unit 500. A plurality of pairs of generation logic expressions are stored in the memory 230 of the issuing unit 200 and the memory 530 of the switching unit 500.

For example, the generation logic expressions L1, L2, . . . , Ln, . . . , LN and the generation keys K'1, K'2, . . . , K'n, . . . , K'N corresponding to these generation logic expressions are registered in both the issuing unit 200 and the switching unit 500. The card unique secret keys K1, K2, . . . , Kn, . . . , KN are generated by card unique numbers, the generation keys K'1 K'2, . . . , K'n, . . . , K'N and the generation logic expressions L1, L2, . . . , Ln, . . . , LN.

In issuing a card, the card unique secret key Kn generated by processing the card unique number and the generation key K'n by the generation logic expression Ln is set in the IC card 300. In using the IC card 300 in which the card unique secret key Kn is set, the card unique secret key Kn is generated in the switching unit 500 as follows. That is, in the switching unit 500, the card unique secret key Kn is generated from the card unique number sent from the IC card 300 via the telephone set 400 and the generation key K'n in the memory 530 of the switching unit 500 by using the generation logic expression Ln in the memory 530. The value n described above properly changes, similar to the second embodiment.

The switching unit 500 manages the secret key by the following method. First, a generation key and logic identical to the generation key K'n and logic Ln stored in the IC card 300 are included in a switching unit control program, and predetermined generation key and logic are selected as needed. Second, only the applied generation key and logic are held (sequentially rewritten). By these methods, the system becomes more difficult to analyze.

The security of the IC card processing system according to the third embodiment is protected as follows.

A manufacturing equipment 100 registers a card control program including an authenticator generation function in the IC card 300. The issuing unit 200 registers a card unique number, a message rate, and a plurality of card unique secret keys 1 to N in the card. The unique secret keys 1 to N are generated by corresponding secret key generation functions 1 to N on the basis of card unique numbers and generation keys 1 to N in the memory 230 of the issuing unit 200.

For example, when the IC card 300 is inserted in the telephone set 400, the telephone set 400 generates a random number from a telephone set unique number in the memory 430 and date information supplied from a timer 440 by using the random number generation function in a memory 430 (ST140). The generated random number is sent to the IC card 300 and the switching unit 500. Since the date information supplied from the timer 440 changes for each IC card 300, the random number also changes for each IC card 300.

The card 300 which has received the random number generated by the telephone set 400 generates an authenticator from the random number generated by the telephone set, and a card unique secret key n and message rate information in the memory 330 by using the authenticator generation function in the memory 330 (ST142). The generated authenticator is sent to the telephone set 400 together with the message rate information and a card unique number in the memory 330.

The telephone set 400 which has received the message rate information, card unique number, and authenticator sent from the IC card 300 transmits them to the switching unit 500 together with the random number generated in advance and sent to the IC card 300.

The switching unit 500 generates a unique secret key n corresponding to the card inserted in the telephone set 400 by using secret key generation function n and key n in the memory 530. The switching unit 500 generates an authenticator from the message rate information received from the telephone set 400 and the random number generated by the telephone set 400 by using the generated unique secret key n and an authenticator generation function in the memory 530 (ST144). The switching unit 500 compares, at a comparator 540, the authenticator generated by the switching unit 500 with the authenticator sent via the telephone set 400 (ST146). From the comparison result of the comparator 540, a telephone conversation enable/disable determination unit 550 determines whether telephone conversation using the IC card inserted in the telephone set 400 is enabled/disabled. For example, if the authenticator generated by the switching unit 500 coincides with the authenticator sent via the telephone set 400 (YES in ST148), telephone conversation (transaction) using the IC card inserted in the telephone set 400 is permitted to connect lines (ST150). If they do not coincide with each other (NO in ST148), no telephone conversation (transaction) using the IC card inserted in the telephone set 400 is permitted (ST152).

When the operation using an arbitrary card unique secret key has continued for a predetermined period, or the card unique secret key may leak out, a card unique secret key change command is sent from the switching unit 500 via the telephone set 400. In response to this, the operated card unique secret key is changed. The change in card unique secret key means changes in generation key and secret key generation function.

Communication messages exchanged between the IC card 300, the telephone set 400, and the switching unit 500 will be described with reference to FIGS. 20 to 25.

These messages are classified into a message used when the telephone set 400 itself communicates with the IC card 300, and a message used when the telephone set 400 intermediates between communication of the switching unit 500 and the IC card 300.

Generally, the IC card 300 operates in accordance with an external instruction. That is, the IC card 300 receives an external instruction message, and returns a response message in response to it. FIG. 20 shows the entire format of a message common to the instruction and response messages. In the entire format of the message, information of the main part representing the contents of an instruction/response is sandwiched between pieces of transmission control information.

FIGS. 21 to 25 are views for explaining the main part representing the contents of the instruction/ response.

As shown in FIGS. 21 to 25, an instruction code representing instruction contents is arranged at the start of the main part of the instruction message. Subsequent to this instruction code, information required to execute the instruction is added. As shown in FIGS. 21 to 25, a display code representing the execution result of the instruction is arranged at the start of the main part of the response message. Subsequent to this display code, another information is added.

FIG. 21 shows the main part of a key collation message. This key collation message is used to collate a collation key in reading a secret key from a setting IC card.

FIG. 22 shows the main part of a data write message. This data write message is used to write various data in the IC card 300 in issuing the IC card 300 by the issuing unit 200.

Figure 23:
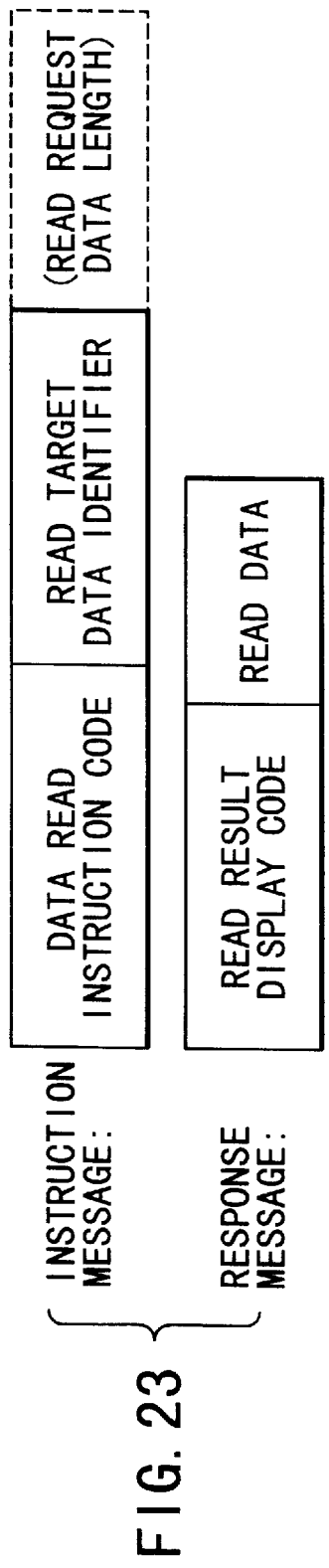
FIG. 23 is a view schematically showing a data read message.

FIG. 23 is the main part of a data read message. This data read message is used in reading various data from the IC card 300 by the telephone set 400.

Figure 24:
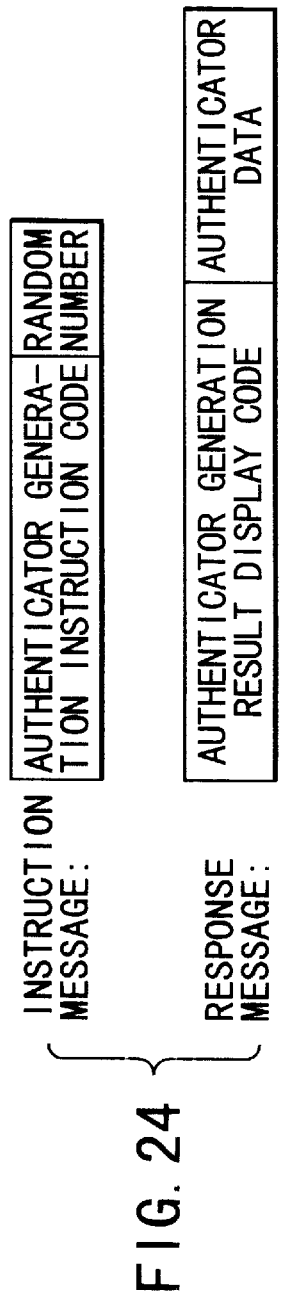
FIG. 24 is a view schematically showing an authenticator generation message.

FIG. 24 shows the main part of an authenticator generation message. This authenticator generation message is issued from the telephone set 400 for the IC card 300, and used in causing the IC card 300 to generate an authenticator.

Figure 25:
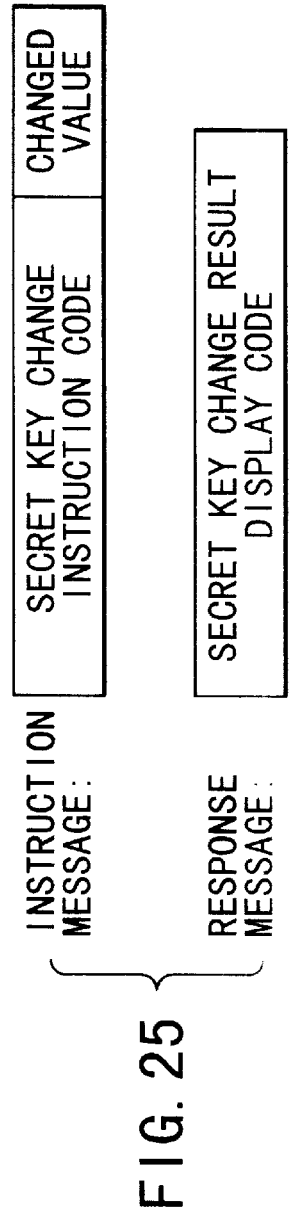
FIG. 25 is a view schematically showing an applied secret key change message.

FIG. 25 shows the main part of a secret key change message. This secret key change message is used to designate a key to be applied to the IC card 300 in changing the secret key.

The embodiments of the present invention have exemplified the telephone set as the terminal device of the IC card. However, the terminal device of the IC card processing system of the present invention is not limited to this. For example, the present invention can be applied to a public terminal used by many unspecified people.

According to the present invention, the IC card processing system in which secret information (secret key and the like) serving as the main point of the security hardly leaks out, and, even when the secret information leaks out, illicit use with the leaked secret information can be prevented can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. An integrated circuit card, comprising:

a communication device for receiving external data;

a memory device for storing (a) value data representing an effective value and (b) authentication code generation data, wherein said memory device comprises a memory section for storing (c) first key data, (d) second key data different from the first key data, and (e) card unique data unique to the integrated circuit card; and an authentication code generation device for processing the value data and the external data, wherein said authentication code generation device comprises:

a first generation device for processing the value data, the first key data, the card unique data, and the external data by using the authentication code generation data to generate a first authentication code; and a second generation device for processing the value data, the second key data, the card unique data, and the external data by using the authentication code generation data to generate a second authentication code different from the first authentication code.

2. An integrated circuit card, comprising:

a communication device for receiving external data;

a memory device for storing (a) value data representing an effective value and (b) authentication code generation data, wherein said memory device comprises a memory section for storing (c) card unique data unique to said Integrated circuit card and (d) card unique key data generated on the basis of the card unique data; and an authentication code generation device for processing the value data and the external data wherein said authentication code generation device comprises a generation device for processing the value data, the card unique key data, and the external data by using the authentication code generation data to generate the authentication code.

3. An integrated circuit card processing system comprising (a) an integrated circuit card and an integrated circuit card processing device for processing said integrated circuit card, said integrated circuit card comprising:

a first communication device for receiving random number data transmitted from said integrated circuit card processing device and for transmitting (c) value data representing an effective value and (d) first authentication code generated by said integrated circuit card to said integrated circuit card processing device;

a first memory device for storing (e) the value data and (f) first authentication code generation data; and a first authentication code generation device for processing the value data and the random number data by using the first authentication code generation data to generate the first authentication code, and said integrated circuit card processing device comprising:

a second communication device for receiving the value data and the first authentication code and for transmitting the random number data;

a second memory device for storing second authentication code generation data identical to the first authentication code generation data;

a random number generation device for generating the random number data;

a second authentication code generation device for processing the value data and the random number data by using the second authentication code generation data to generate the second authentication code;

a determination device for comparing the second authentication code with the first authentication code received via said second communication device to obtain a determination result, said determination result relating to validity of said integrated circuit card; and a card handling device for handling said integrated circuit card on the basis of the determination result.

4. A system according to claim 3, wherein said first memory device comprises:

a first memory section for storing first key data, and said first authentication code generation device comprises:

a first generation device for processing the value data, the first key data and the random number data by using the first authentication code generation data to generate the first authentication code;

said second memory device comprises:

a second memory section for storing second key data identical to the first key data; and said second authentication code generation device comprises:

a second generation device for processing the value data, the second key data and the random number data by using the second authentication code generation data to generate the second authentication code.

5. A system according to claim 3, wherein said card handling device comprises:

a card processing device for permitting a transaction when the validity of said integrated circuit card is certified from the determination result and for inhibiting a transaction when the validity of said integrated circuit card is not certified.

6. A system according to claim 3, wherein said second memory device comprises:

a memory section for storing device unique data unique to said integrated circuit card processing device and random number generation data, and said random number generation device comprises:

a generation device for processing the device unique data by using the random number generation data to generate the random number data.

7. A system according to claim 3, further comprising a card issuing unit for writing the value data in said first memory device and for issuing said integrated circuit card in which the value data is written.

8. A system according to claim 3, wherein said integrated circuit card processing device comprises:

a terminal device for directly communicating with said integrated circuit card, and a host device for communicating with said integrated circuit card via said terminal device, said terminal device comprises:

said second communication device and said random number generation device, and said host device comprises:

said second memory device, said second authentication code generation device, said determination device, and said card handling device.

9. A system according to claim 3, wherein said first communication device comprises:

a transmission device for transmitting card unique data unique to said Integrated circuit card, said first memory device comprises:

a first memory section for storing first key data and the card unique data, said first authentication code generation device comprises:

a first generation device for processing the value data the first key data, the card unique data, and the random number data by using the first authentication code generation data to generate the first authentication code, said second communication device comprises:

a reception device for receiving the card unique data transmitted from said integrated circuit card, said second memory device comprises:

a second memory section for storing second key data identical to the first key data, and said second authentication code generation device comprises:

a second generation device for processing the value data, the card unique data, the second key data and the random number data by using the second authentication code generation data to generate the second authentication code.

10. A system according to claim 3, wherein said first communication device comprises:

a transmission device for transmitting card unique data unique to said integrated circuit card, said first memory device comprises:
a first memory section for storing first key data, second key data different from the first key data, and the card unique data, said first authentication code generation device comprises:
a first generation device for processing the value data, the first key data, the card unique data and the random number data by using the first authentication code generation data to generate the first authentication code; and
a second generation device for processing the value data, the second key data, the card unique data and the random number data by using the first authentication code generation data to generate the first authentication code, said second communication device comprises:
a reception device for receiving the card unique data transmitted from said integrated circuit card, said second memory device comprises:
a second memory section for storing third key data identical to the first key data and fourth key data identical to the second key data, said second authentication code generation device comprises:
a third generation device for processing the value data, the card unique data, the third key data and the random number data by using the second authentication code generation data device to generate the second authentication code; and
a fourth generation for processing the value data, the card unique data, the fourth key data and the random number data by using the second authentication code generation data to generate the second authentication code, and said determination device comprises:
a first determination device for comparing the first authentication code generated by said first generation device with the second authentication code generated by said third generation device to determine the validity of said card; and
a second determination device for comparing the first authentication code generated by said second generation device with the second authentication code generated by said fourth generation device to determine the validity of said card.

11. A system according to claim 3, wherein said first communication device comprises:

a transmission device for transmitting card unique data unique to said integrated circuit card, said first memory device comprises:
a first memory section for storing the card unique data, and first card unique key data generated from the card unique data and first key data, said first authentication code generation device comprises:

a first generation device for processing the value data, the first card unique key data and the random number data by using the first authentication code generation data to generate the first authentication code, said second communication device comprises:
a reception device for receiving the card unique data transmitted from said integrated circuit card, said second memory device comprises:
a second memory section for storing second key data identical to the first key data, said integrated circuit card processing device comprises:
a key data generation device for generating second card unique key data from the card unique data and the second key data, and said second authentication code generation device comprises:
a second generation device for processing the value data, the second card unique key data and the random number data by using the second authentication code generation data to generate the second authentication code.

12. A system according to claim 3, wherein said first communication device comprises:

a transmission device for transmitting card unique data unique to said integrated circuit card, said first memory device comprises:
a first memory section for storing (g) the card unique data, (h) first card unique key data generated from the card unique data and first key data, and (i) second card unique key data generated from the card unique data and second key data different from the first key data, said first authentication code generation device comprises:
a first generation device for processing the value data, the first card unique key data and the random number data by using the first authentication code generation data to generate the first authentication code; and
a second generation device for processing the value data, the second card unique key data and the random number data by using the first authentication code generation data to generate the first authentication code, said second communication device comprises:
a reception device for receiving the card unique data transmitted from said integrated circuit card, said second memory device comprises:
a second memory section for storing third key data identical to the first key data and fourth key data identical to the second key data, said integrated circuit card processing device comprises:
a first key data generation device for generating third card unique key data from the card unique data and the third key data; and
a second key data generation device for generating fourth card unique key data from the card unique data and the fourth key data, said second authentication code generation device comprises:
a third generation device for processing the value data, the third card unique key data, and the random number data by using the second authentication code generation data to generate the second authentication code; and
a fourth generation device for processing the value data, the fourth card unique key data, and the random number data by using the second authentication code generation data to generate the second authentication code, and said determination device comprises:
a first determination device for comparing the first authentication code with the second authentication code to determine the validity of said card; and
a second determination device for comparing the first authentication code with the second authentication code to determine the validity of said card.

13. An integrated circuit card authentication method executed in an integrated circuit card in which value data representing an effective value and first authentication code generation data are stored, and an integrated circuit card processing device which processes said integrated circuit card and stores second authentication code generation data identical to the first authentication code generation data, comprising:

the first step of generating random number data;
the second step of processing the value data stored in said integrated circuit card and the random number data generated in the first step, by using the first authentication code generation data stored in said integrated circuit card to generate first authentication code;
the third step of processing the value data stored in said integrated circuit card and the random number data generated in the first step, by using the second authentication code generation data stored in said integrated circuit card processing device to generate second authentication code; and
the fourth step of comparing the first authentication code with the second authentication code to authenticate said integrated circuit card.

14. A method according to claim 13, wherein said integrated circuit card stores first key data,
said integrated circuit card processing device stores second key data identical to the first key data,
the second step comprises:
the fifth step of processing the value data and the first key data which are stored in said integrated circuit card, and the random number data generated in the first step, by using the first authentication code generation data stored in said integrated circuit card to generate the first authentication code, and
the third step comprises:
the sixth step of processing the value data stored in said integrated circuit card, the second key data stored in said integrated circuit card processing device, and the random number data generated in the first step, by using the second authentication code generation data stored in said integrated circuit card processing device to generate the second authentication code.

15. A method according to claim 13, further comprising the fifth step of permitting transaction using said integrated circuit card when validity of said integrated circuit card is certified from an authentication result in the fourth step, and inhibiting transaction using said integrated circuit card when the validity of said integrated circuit card is not certified.

16. A method according to claim 13, wherein said integrated circuit card processing device stores device unique data unique to said integrated circuit card processing device and random number generation data used to generate the random number data, and
the first step comprises:
the fifth step of processing the device unique data stored in said integrated circuit card processing device, by using the random number generation data stored in said integrated circuit card processing device to generate the random number data.

17. A method according to claim 13, wherein said integrated circuit card stores first key data and card unique data,
said integrated circuit card processing device stores second key data identical to the first key data,
the second step comprises:
the fifth step of processing the value data, the first key data, and the card unique data which are stored in said integrated circuit card, and the random number data generated in the first step, by using the first authentication code generation data stored in said integrated circuit card to generate the first authentication code, and
the third step comprises:
the sixth step of processing the value data and the card unique data which are stored in said integrated circuit card, the second key data stored in said integrated circuit card processing device, and the random number data generated in the first step, by using the second authentication code generation data stored in said integrated circuit card processing device to generate the second authentication code.

18. A method according to claim 13, wherein said integrated circuit card stores first key data, second key data different from the first key data, and card unique data,
said integrated circuit card processing device stores third key data identical to the first key data, and fourth key data identical to the second key data,
the second step comprises:
the fifth step of processing the value data, the first key data, and the card unique data which are stored in said integrated circuit card, and the random number data generated in the first step, by using the first authentication code generation data stored in said integrated circuit card to generate the first authentication code; and
the sixth step of processing the value data, the second key data, and the card unique data which are stored in said integrated circuit card, and the random number data generated in the first step, by using the first authentication code generation data stored in said integrated circuit card to generate the first authentication code,
the third step comprises:
the seventh step of processing the value data and the card unique data which are stored in said integrated circuit card, the third key data stored in said integrated circuit card processing device, and the random number data generated in the first step, by using the second authentication code generation data stored in said integrated circuit card processing device to generate the second authentication code; and
the eighth step of processing the value data and the card unique data which are stored in said integrated circuit card, the fourth key data stored in said integrated circuit card processing device, and the random number data generated in the first step, by using the second authentication code generation data stored in said integrated circuit card processing device to generate the second authentication code, and
the fourth step comprises:
the ninth step of comparing the first authentication code generated in the fifth step with the second authentication code generated in the seventh step to authenticate said integrated circuit card; and the 10th step of comparing the first authentication code generated in the sixth step with the second authentication code generated in the eighth step to authenticate said integrated circuit card.

19. A method according to claim 13, wherein said integrated circuit card stores card unique data unique to said integrated circuit card, and first card unique key data generated from the card unique data and first key data, said integrated circuit card processing device stores second key data identical to the first key data, the second step comprises:
the fifth step of processing the value data and the first card unique key data which are stored in said integrated circuit card, and the random number data generated in the first step, by using the first authentication code generation data stored in said integrated circuit card to generate the first authentication code, and the third step comprises:
the sixth step of generating second card unique key data from the card unique data stored in said integrated circuit card and the second key data stored in said integrated circuit card processing device; and the seventh step of processing the value data stored in said integrated circuit card, the second card unique key data generated in the sixth step, and the random number data generated in the first step, by using the second authentication code generation data stored in said integrated circuit card processing device to generate the second authentication code.

20. A method according to claim 13, wherein said integrated circuit card stores card unique data unique to said integrated circuit card, first card unique key data generated from the card unique data and first key data, and second card unique key data generated from the card unique data and second key data different from the first key data, said integrated circuit card processing device stores third key data identical to the first key data, and fourth key data identical to the second key data, the second step comprises:
the eighth step of processing the value data and the first card unique key data which are stored in said integrated circuit card, and the random number data generated in the first step, by using the first authentication code generation data stored in said integrated circuit card to generate the first authentication code; and the ninth step of processing the value data and the second card unique key data which are stored in said integrated circuit card, and the random number data generated in the first step, by using the first authentication code generation data stored in said integrated circuit card to generate the first authentication code, the third step comprises:
the 10th step of generating the second card unique key data from the card unique data stored in said integrated circuit card and the third key data stored in said integrated circuit card processing device;

the 11th step of generating the second card unique key data from the card unique data stored in said integrated circuit card and the fourth key data stored in said integrated circuit card processing device;

the 12th step of processing the value data stored in said integrated circuit card, the second card unique key data generated in the 10th step, and the random number data generated in the first step, by using the second authentication code generation data stored in said integrated circuit card processing device to generate the second authentication code; and the 13th step of processing the value data stored in said integrated circuit card, the second card unique key data generated in the 11th step, and the random number data generated in the first step, by using the second authentication code generation data stored in said integrated circuit card processing device to generate the second authentication code, and the fourth step comprises:
the 14th step of comparing the first authentication code generated in the eighth step with the second authentication code generated in the 12th step to authenticate said integrated circuit card; and the 15th step of comparing the first authentication code generated in the ninth step with the second authentication code generated in the 13th step to authenticate said integrated circuit card.

* * * * *